INVENTOR.
Jurg A. Senn
BY W. D. O'Connor
Attorney

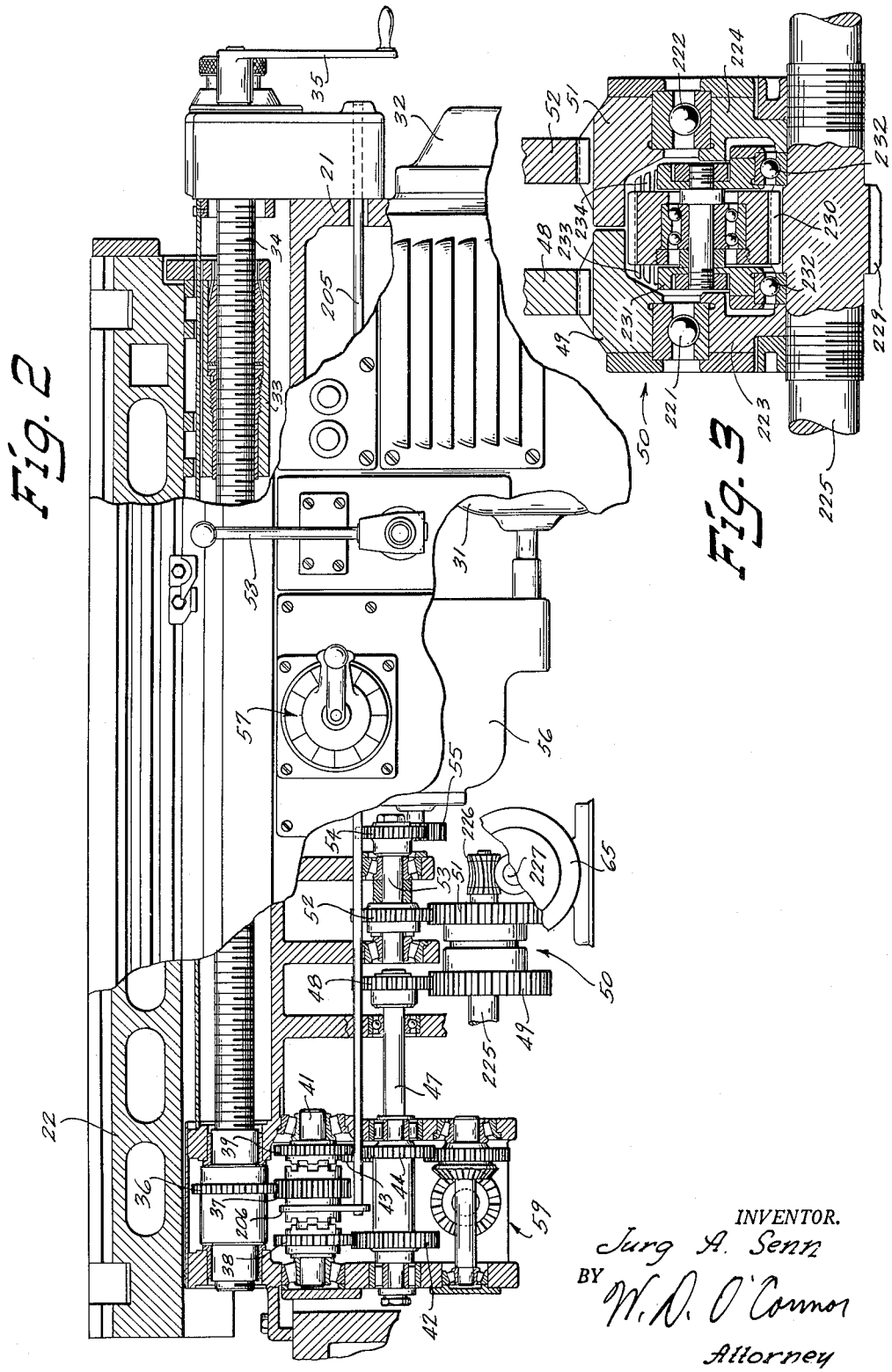

June 5, 1956  J. A. SENN  2,748,665
MACHINE TOOL POSITIONING MECHANISM
Filed March 17, 1949  11 Sheets-Sheet 3

INVENTOR.
Jurg A. Senn
BY W. D. O'Connor
Attorney

June 5, 1956 J. A. SENN 2,748,665
MACHINE TOOL POSITIONING MECHANISM
Filed March 17, 1949 11 Sheets-Sheet 4
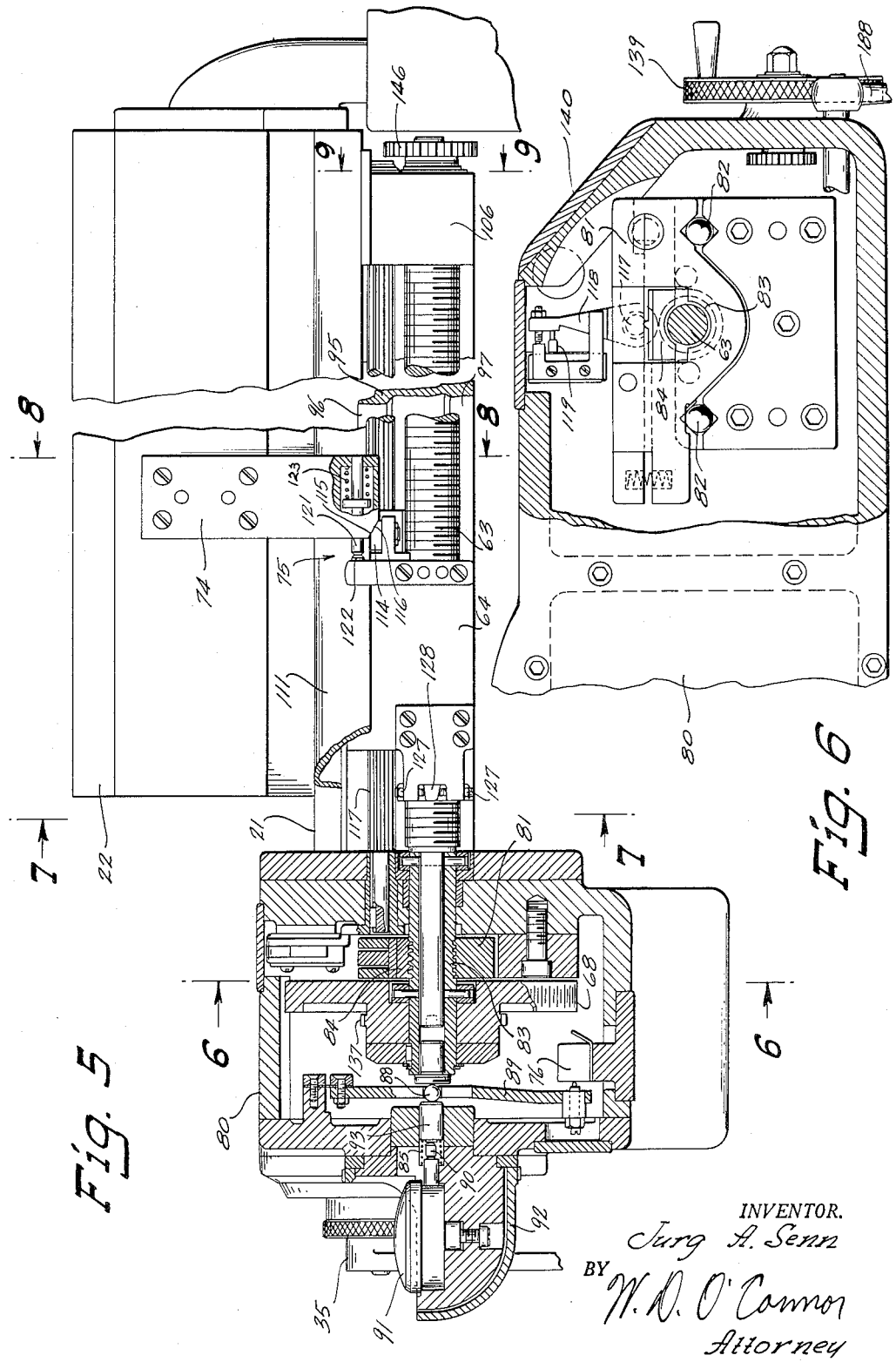
INVENTOR.
Jurg A. Senn
BY
W. D. O'Connor
Attorney June 5, 1956   J. A. SENN   2,748,665
MACHINE TOOL POSITIONING MECHANISM
Filed March 17, 1949   11 Sheets-Sheet 5
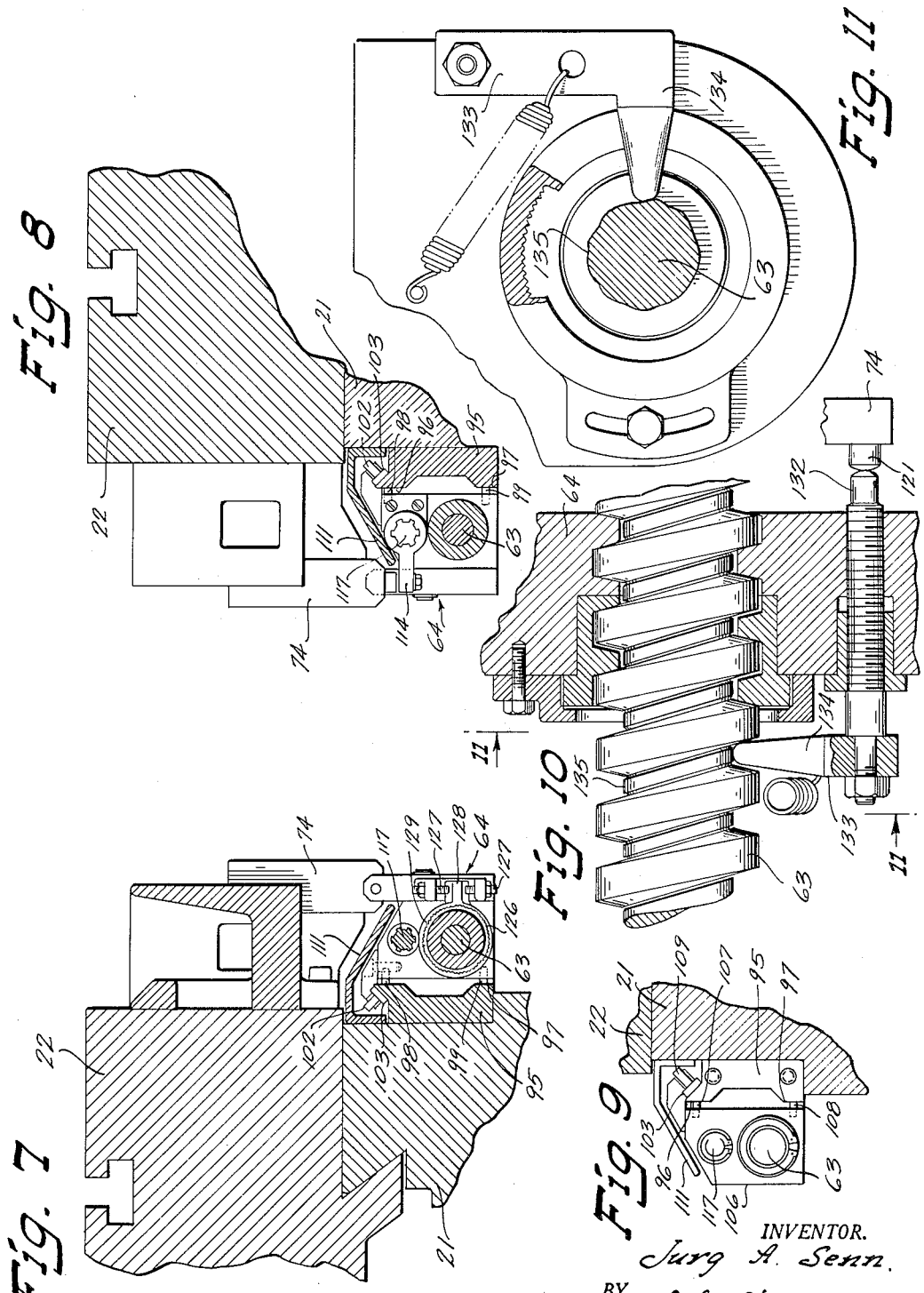
INVENTOR.
Jurg A. Senn.
BY W. D. O'Connor
Attorney June 5, 1956   J. A. SENN   2,748,665
MACHINE TOOL POSITIONING MECHANISM
Filed March 17, 1949   11 Sheets-Sheet 6
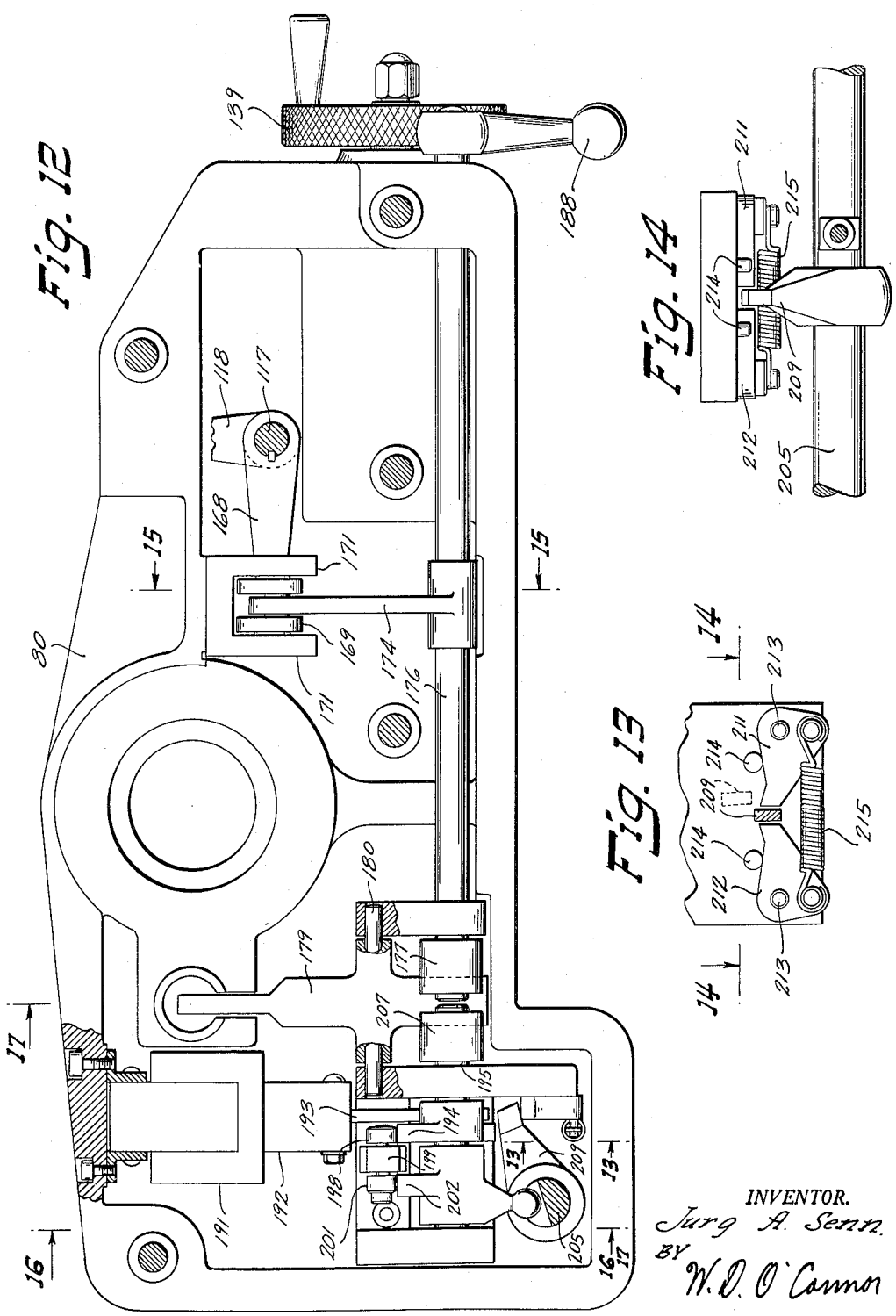
INVENTOR.
Jurg A. Senn
BY
W. D. O'Connor
Attorney

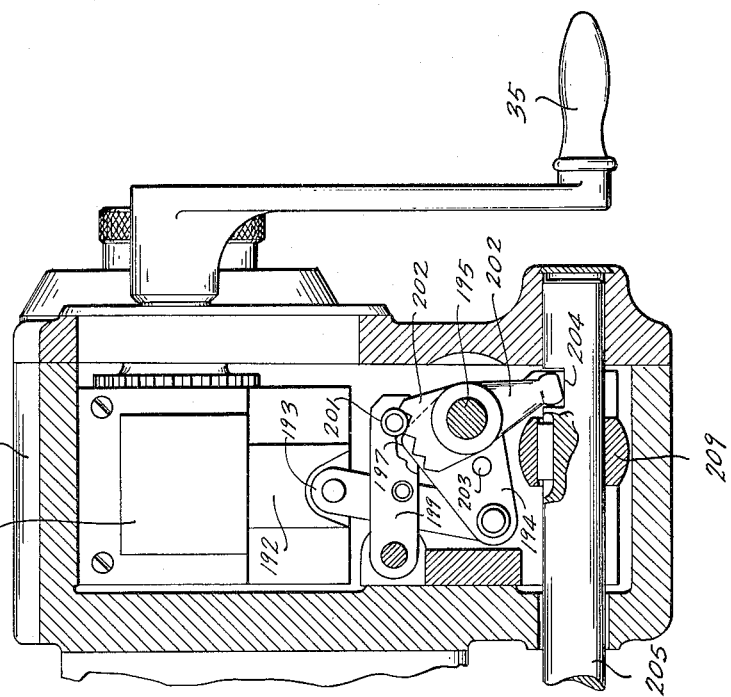
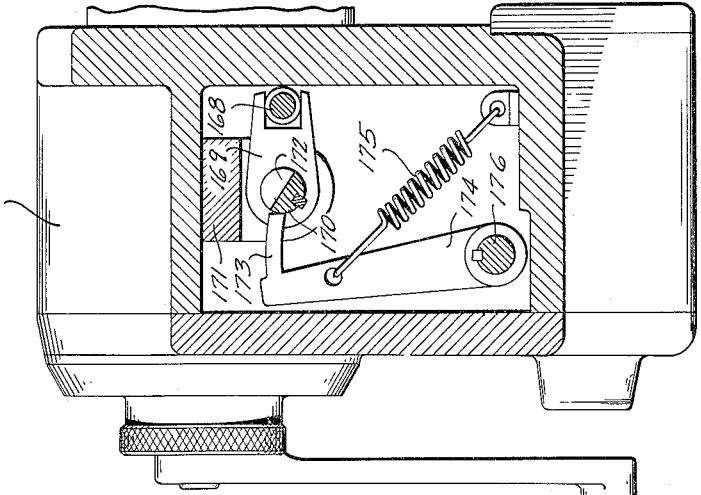

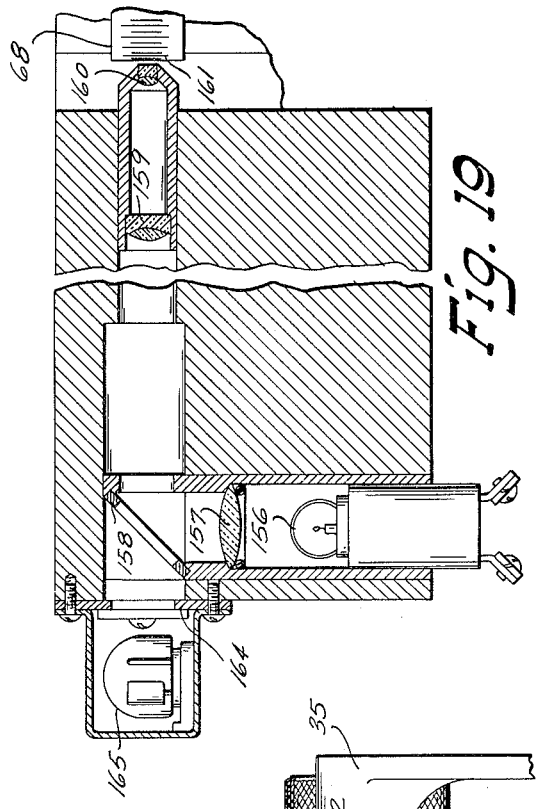
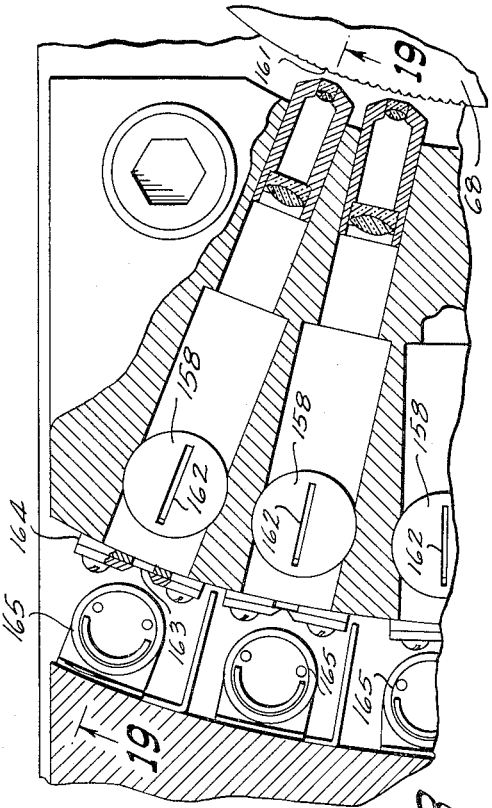
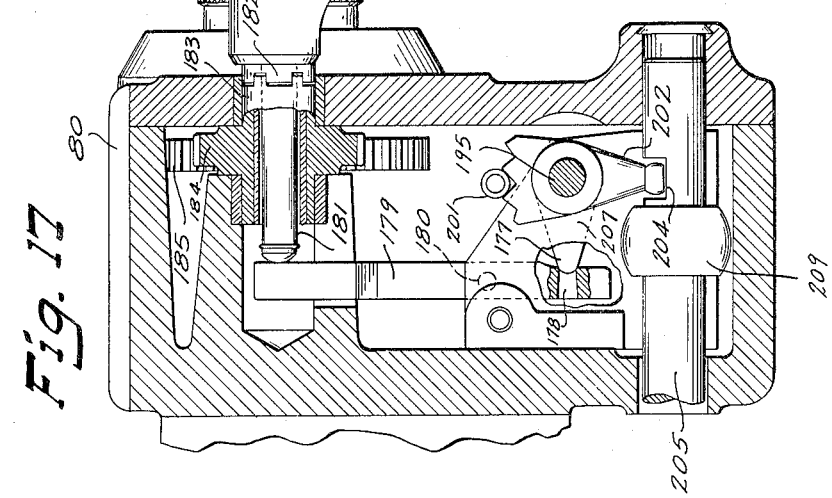

June 5, 1956 J. A. SENN 2,748,665
MACHINE TOOL POSITIONING MECHANISM
Filed March 17, 1949 11 Sheets-Sheet 9

INVENTOR.
Jurg A. Senn
BY
W. D. O'Connor
Attorney

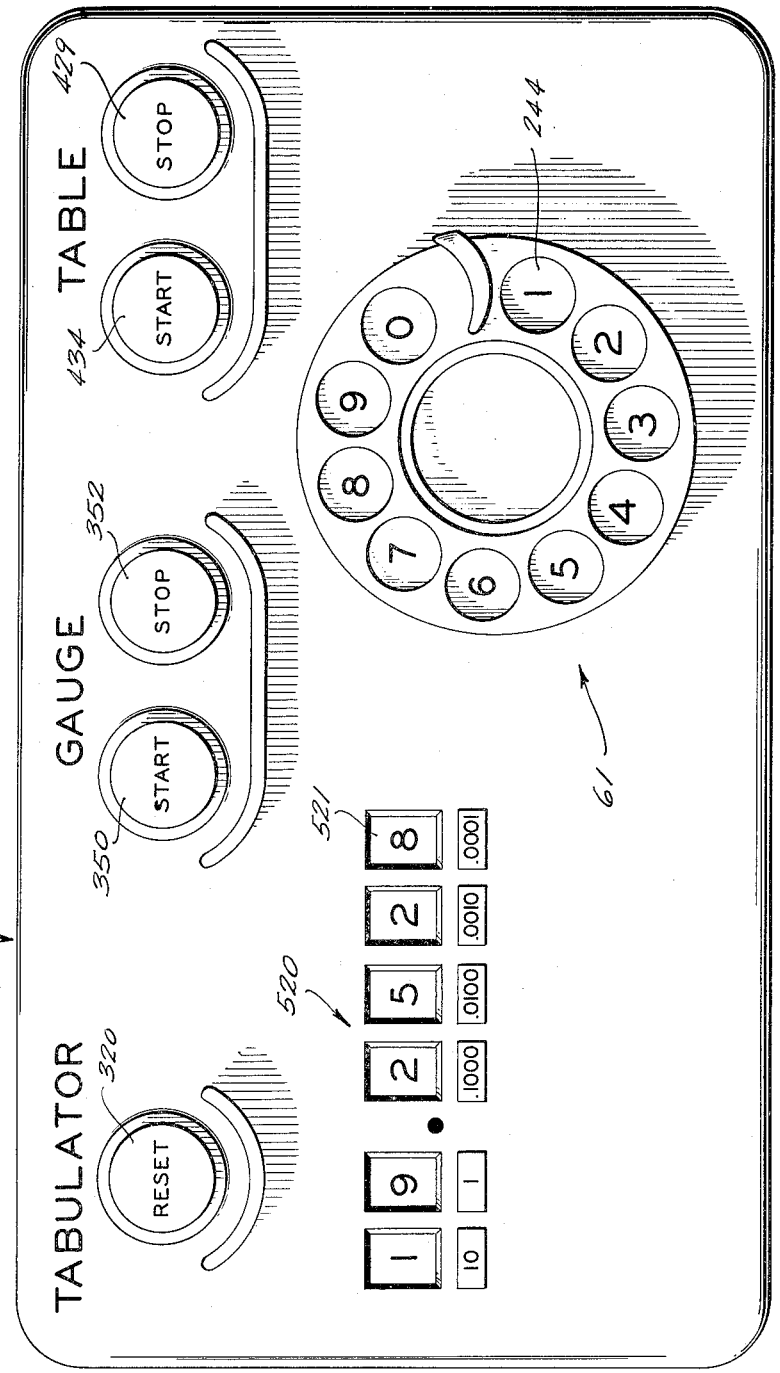

United States Patent Office 2,748,665
Patented June 5, 1956

2,748,665

MACHINE TOOL POSITIONING MECHANISM

Jurg A. Senn, Milwaukee, Wis., assignor to Kearney & Trecker Corporation, West Allis, Wis., a corporation of Wisconsin Application March 17, 1949, Serial No. 81,992

16 Claims. (Cl. 90—21)

This invention relates generally to machine tools and more particularly to apparatus for effecting automatic positioning of a machine tool element.

A general object of the invention is to provide improved apparatus for controlling movements of a machine tool carriage or the like.

Another object of the invention is to provide improved means for positioning a machine tool carriage with a high degree of accuracy.

Another object of the invention is to provide apparatus for effecting precise positioning of movable members of a machine tool by remote control.

Another object is to provide a machine tool in which a movable element is positioned to conform with an accurate gauge that is displaced linearly in accordance with a predetermined number of units of displacement recorded mechanically as a numerical expression.

Another object is to provide means for positioning a machine tool element or the like whereby the linear displacement required of the element is recorded mechanically in numerical terms representing units of displacement which are then set off on an accurate gauge.

Another object is to provide for precisely positioning a machine tool carriage by mechanically counting scale indicia representing dimensional increments of movement smaller than the permissible error of positioning.

Another object is to provide a machine tool positioning mechanism in which a predetermined linear displacement is recorded mechanically in numerical terms representing units of displacement, the recorded data being utilized to effect precise positioning of an accurate gauging device which in turn controls the positioning of a machine tool carriage.

Another object is to provide an arrangement for recording a linear dimension in terms of a numerical value representing the summation of incremental displacements.

Another object is to provide a machine tool in which an accurate gauging screw operates to adjust a gauge stop, the screw being mounted for endwise movement when the machine element engages the stop and functioning to control movement of the element.

Another object is to provide an improved scale and vernier arrangement for effecting accurate measurement of displacements.

Another object is to provide an arrangement for positioning an accurate gauging apparatus wherein movement of the gauge is scanned by a photoelectric cell connected to actuate an electronic counter that controls the movement.

Another object is to provide a plurality of photoelectric cells arranged to scan a scale for counting the passing scale indicia wherein a vernier effect is obtained by selecting one or another of the photoelectric cells to operate with the scale.

Another object is to provide a mechanism which will automatically disengage the power train to a movable element upon completion of a positioning movement to preclude further movement due to residual forces in the transmission.

A further object is to provide improved apparatus for preventing the reversing of a machine tool transmission while the rapid traverse power train is engaged.

According to this invention, a movable object such as a machine tool carriage may be precisely positioned automatically by remote control through operation of apparatus wherein displacement of the object is preset by recording numerically data representing increments of movement of the object. A gauge of highly accurate construction is adjusted in accordance with the numerically recorded data and the carriage moved precisely to the position established by the gauge. The numerical data is preferably recorded in an electronic counter through the operation of suitable tabulating mechanism. The gauge is then advanced while a scale associated with it is scanned photoelectrically to count indicia on the scale representing increments of movement. When the number of scale indicia scanned equals the number preset on the electronic counter, the gauge is stopped precisely at the position predetermined through operation of the tabulator. The machine tool carriage or other object is then advanced toward the position established by the gauge, its speed being reduced as it approaches the gauge position, and the carriage then finally stopped precisely at the predetermined position. The electronic counter is preferably arranged in decades corresponding with the digits in the numerical expression of displacement. The decades are preset through actuation of a keyboard, a telephone dial pulser, or any other suitable arrangement for expressing displacement in numerical terms. The movement of the gauge operates upon the counter preferably through a photoelectric gauge-scanning apparatus which includes a vernier device constituted by a plurality of suitably spaced photoelectric cells. The gauge itself is designed to afford the highest degree of accuracy in establishing the predetermined position recorded numerically in the counter. Likewise, the positioning mechanism is highly accurate and is arranged to effect movement of the carriage by power at a rapid rate until the final position is approached at which time the rate of travel is automatically reduced and the carriage continues at a slow rate to the precise position established by the gauge.

The foregoing and other objects of this invention, which will become more fully apparent from the following detailed specification, may be achieved by means of the particular structure constituting an exemplifying embodiment of the invention that is shown in and described in connection with the accompanying drawings in which:

Fig. 2 is a fragmentary view largely in longitudinal section through the base and the work supporting table of the machine tool, showing the table driving mechanism as viewed from the other side of the machine;

Fig. 3 is an enlarged detailed view in longitudinal section through a slow speed positioning drive device incorporated in the table driving mechanism;

Fig. 5 is a view partly in elevation and partly in longitudinal section through the machine bed and end bracket, showing the details of the gauging screw and positioning nut mechanism that may be seen in Fig. 1 just beneath the rear edge of the table;

Fig. 6 is a fragmentary view, partly in section taken on the plane represented by the line 6—6 in Fig. 5, showing the front mounting of the gauge screw and the table speed reducing switch;

Fig. 7 is a fragmentary view in vertical transverse section taken on the plane represented by the line 7—7 in Fig. 5 showing the gauge nut support;

Fig. 8 is a fragmentary view in vertical transverse section, taken on the plane represented by the line 8—8 in Fig. 5;

Fig. 9 is a fragmentary view, partly in vertical transverse section, taken substantially on the plane represented by the line 9—9 in Fig. 5, showing the rear mounting of the gauge screw;

Fig. 10 is a view, partly in vertical section, taken longitudinally along the gauge screw, showing a modification of the gauge screw and nut mechanism;

Fig. 11 is a fragmentary view, partly in vertical section, taken substantially on the plane represented by the line 11—11 in Fig. 10;

Fig. 12 is a view, partly in elevation and partly in vertilongitudinal section through the bed and bracket, illustrating a portion of the control mechanism;

Fig. 13 is a fragmentary view, partly in vertical section on the plane represented by the line 13—13 in Fig. 12, depicting a portion of the rapid traverse control mechanism;

Fig. 14 is a plan view, partly in horizontal section, taken on the plane represented by the line 14—14 in Fig. 13;

Fig. 15 is a view, partially in vertical section, taken substantially on the plane represented by the line 15—15 in Fig 12, illustrating a portion of the control mechanism for disengaging the hand feed crank as the table approaches the end of a positioning movement;

Fig. 16 is a view, partly in vertical section on the plane represented by the line 16—16 in Fig. 12, depicting the control mechanism for disengaging the power transmission from the table at the end of a positioning movement;

Fig. 17 is another view, partly in vertical section, taken substantially on the plane represented by the line 17—17 in Fig. 12;

Fig. 18 is an enlarged horizontal sectional view of the photoelectric scanning device for observing increments of movement;

Fig. 19 is a fragmentary view in vertical section taken along the plane represented by the line 19—19 in Fig. 18;

Figure 1:
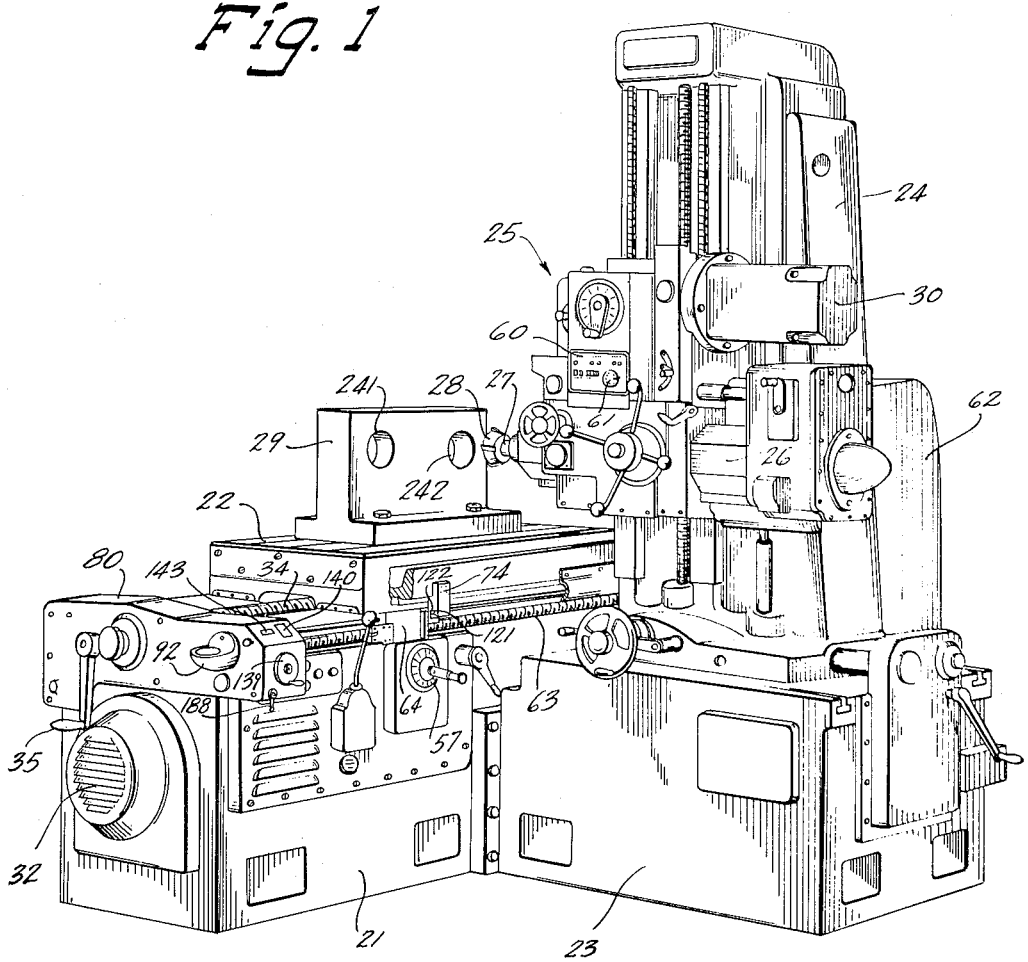
Figure 1 is a general view in perspective of a machine tool incorporating the invention, as seen looking toward the operator's station.

The particular machine tool shown in the drawings as exemplifying apparatus in which the present invention is utilized with especially advantageous results is a precision milling and boring machine of the horizontal spindle type, although it is to be understood that the invention may be employed in connection with other machine tools or with machinery of other types, possibly quite different in construction.

Referring more specifically to the drawings and particularly to the general view of the machine shown in Fig. 1, it appears that the exemplary milling and boring machine comprises essentially a hollow bed or base 21 that constitutes the foundation or main frame of the machine and forms a housing for most of its actuating mechanism. Slidably mounted on the bed 21 is a work supporting table or carriage 22 arranged to be reciprocated longitudinally along suitable guide ways formed in the top of the bed. The table 22 may be moved by power in either direction, either at a selected feed rate or at rapid traverse rate, by means of the usual driving mechanism disposed within the bed. Furthermore, in accordance with the present invention, the table may be moved precisely to any predetermined position within its range of movement through the operation of fully automatic positioning mechanism functioning by remote control.

As shown in Fig. 1, the base or bed 21 is provided at one side with a laterally projecting bed extension 23 upon which is slidably mounted a spindle head carrying column 24 that extends upright at the side of the table 22. Slidably mounted for vertical movement along one side of the supporting column 24 is a cutter spindle head 25 of the type constituting a self-contained unit. As shown, the head 25 carries a horizontally slidable spindle supporting ram 26 in which is rotatably mounted a cutter carrying spindle 27 disposed to cooperate with the work table 22. By this arrangement, a cutter 28 mounted in the spindle 27 may be adjusted vertically relative to a workpiece 29 mounted on the table 22 by moving the entire spindle head 25 vertically along the column 24. Likewise, the cutter 28 may be adjusted horizontally toward or from the workpiece 29, in direction transversely of the table 22, by advancing or retracting the spindle supporting ram 26 within the head 25 or by moving the column 24 along the bed extension. These vertical and horizontal movements of the cutter spindle taken with the longitudinal movement of the table 22 transversely of the cutter spindle provide for relative adjustment between the cutter and the workpiece in three mutually transverse planes, whereby the cutter may be caused to operate at any desired position relative to the workpiece within the capacity of the machine.

Power for rotating the cutter 28 and for effecting power feeding movements of the ram 26, is derived from a motor 30 mounted on the spindle head 25 that operates selectively shiftable gearing, as more fully explained in the copending application of Joseph B. Armitage and Orrin W. Barker, filed June 28, 1946, Serial No. 680,256 and matured into Patent Number 2,605,678 issued August 5, 1952.

Power for effecting longitudinal movements of the table 22 at selected speed and corresponding vertical movements of the spindle carrying head 25 is derived from a motor 31 which is housed within the bed 21 in position to be accessible upon opening a door 32 at the end of the bed. Referring to Fig. 2, in which part of the machine bed is shown in section looking from the side opposite to that shown in Fig. 1, it will be seen that the apparatus for effecting sliding movement of the table 22 includes a nut 33 that is fixed to and depends from the underside of the table near its right end. The nut 33 has threaded engagement with a table screw 34 which is rotatably mounted at its ends in bearings fixed to the bed 21, the arrangement being such that when the screw 34 is rotated, the table 22 is caused to move longitudinally along the guide ways on top of the bed 21. For effecting manual positioning of the table 22, the screw 34 is arranged to be turned by a hand crank 35 which is journalled in and projects at the right end of the bed.

The other end of the screw 34 is provided with a gear 36 whereby the screw may be rotated by power derived from the motor 31 in effecting feeding or rapid traverse movements of the table 22. As shown, the gear 36 has meshing engagement with a slidably mounted clutch gear 37 which is arranged to be moved from the central neutral position shown, into clutching engagement with the one or the other of oppositely driven clutch gears 38 and 39 selectively, the three gears being mounted coaxially but for independent rotation on a reversing clutch shaft 41. The clutch gear 38 meshes directly with a driving gear 42 while the opposite clutch gear 39 is driven by an intermediate reversing idler gear 43 that in turn meshes with a driving gear 44, the driving gears 42 and 44 both being fixed on a driving shaft 47.

As shown, the driving shaft 47 is rotatably mounted in the bed 21 and is fitted with a gear 48 that has meshing engagement with a gear 49 of a positioning drive mechanism 50. Another gear 51 of the positioning drive mechanism 50 meshes with a gear 52 on a shaft 53 that carries a gear 54 which meshes with a gear 55 on a feed rate changing transmission mechanism 56, the mechanism 50 operating ordinarily as a substantially direct driving connection between the gears 51 and 49. The feed changing transmission mechanism 56 is connected to be driven by the motor 31 and is provided with a speed changing crank and indicating dial mechanism 57 mounted on the side of the bed 21, by means of which it may be adjusted in well known manner for effecting operation of the table 22 at any one of a plurality of different feed rates, a duplicate crank and dial mechanism being mounted on the other side of the bed 21 as shown in Fig. 1.

Operation of the slidably mounted reversing clutch gear 37 for selecting the direction of movement of the table 22 is effected in well known manner by linkage actuated by either one of duplicate control levers 58 pivotally mounted respectively on the opposite sides of the machine bed. The levers 58 are connected to a control rod 205 which has a shifting fork 206 secured to its left end as shown in Fig. 2. The shifting fork 206 has engagement with the clutch gear 37 to move it in either direction in accordance with the movement of the control rod 205. The arrangement is such that when either lever 58 is pivoted to the right or to the left from the central neutral position shown, the clutch gear 37 is shifted accordingly to effect movement of the table 22 in the corresponding direction. Furthermore, the control levers 58 are also pivotally mounted for movement toward or from the base 21, the arrangement being such that when either lever is moved toward the base, the table driving action occurs at the selected feed rate, but when the lever is pivoted outwardly away from the base, rapid traverse drive mechanism incorporated in the rate changing mechanism 56 is engaged to move the table 22 at rapid traverse rate in the selected direction. Power feeding movements of the spindle head 25 vertically along the column 24 may be effected at the selected feed rate or at rapid traverse rate by means of an interconnecting horizontal transmission train 59 that is driven by the gear 44 on the power driving shaft 47 and connects with the head moving mechanism in the column in the manner more fully described in the previously mentioned copending application.

In accordance with the principles of the present invention, the work table 22 or any similar carriage may be moved automatically to any predetermined position within its range of movement by remote control and with a high degree of precision. This is accomplished merely by impressing on a tabulator associated with the machine the numerical expression representing the distance through which the table is to be moved. The mechanism then moves an accurate gauge member through the desired distance automatically and thereupon advances the table to the position established by the gauge member. Thus the table may be precisely positioned automatically from numerical data without the use of external measuring instruments or reliance upon the skill of the operator other than his ability to transfer numerical values.

Assume, for example, the table 22 to be in a position in which the workpiece 29 is disposed relative to the cutting tool 28 for effecting an initial cutting operation and that a second operation is to be effected at a precise predetermined distance from the first. After the first operation is completed, the operator may advance the table 22 to bring the workpiece 29 into the second cutting position precisely and wholly by automatic means, without effecting any dimensional measuring operation in the usual sense of the term. To initiate any such desired movement of the table, the operator merely sets up the appropriate dimension, as expressed numerically, on a tabulating control panel 60 conveniently mounted on the spindle head 25. As shown in Fig. 1 and in greater detail in Fig. 22, the control panel 60 includes a tabulator 61 comprising a pulsing dial mechanism generally similar to the dial mechanism of an automatic telephone. Although the control panel is shown mounted on the spindle head, it may be mounted on any other part of the machine or at some point entirely removed from the machine. To effect a desired displacement of the table, the operator merely dials the digits of the numerical expression representing the desired displacement, expressed for instance, in inches and tenths of thousandths of an inch.

Figure 4:
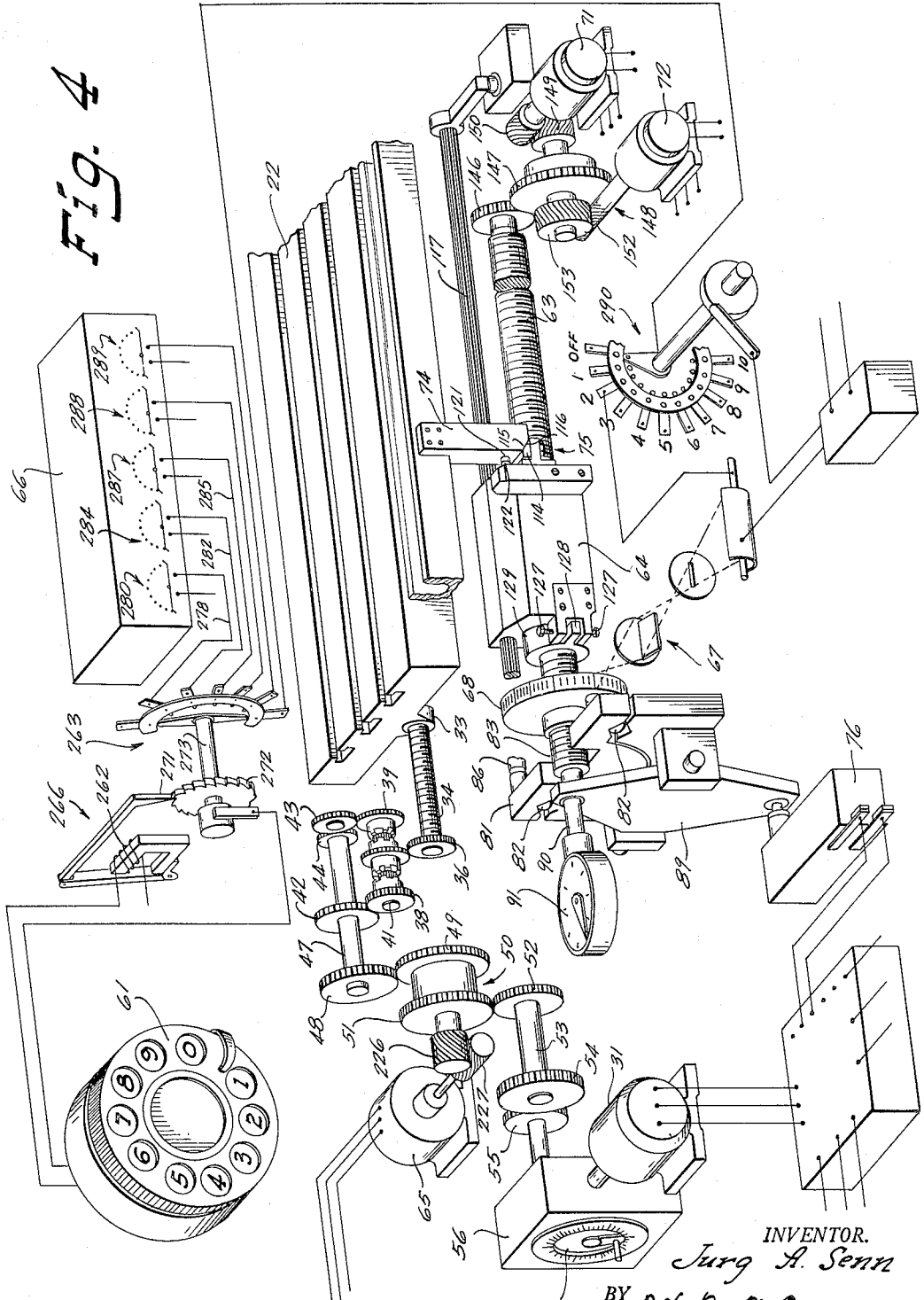
Fig. 4 is a schematic diagram of the entire apparatus for effecting automatic positioning of the table of the machine tool in accordance with the invention.

The dial mechanism 61 is operatively connected with control mechanism housed in a control box 62 mounted behind the column 24. The control mechanism functions automatically to effect rotation of a gauge screw 63 mounted on the bed 21 beneath the rear edge of the table 22, as shown in Figs. 1, 4 and 5, in manner to move a gauge nut 64 along the screw through the predetermined distance, first at a rapid traverse rate until the final position is approached and then at a slow rate to the precise position desired. The table driving motor 31 is then energized to effect movement of the table 22 at rapid traverse rate along the bed 21 toward the position established by the gauge nut 64. As the table approaches the preestablished position, the main table driving motor 31 is deenergized automatically and an auxiliary or inching motor 65, shown in Fig. 2, is energized to drive the positioning drive mechanism 50 in manner to complete the movement of the table at slow speed precisely to the predetermined position at which the cutting tool 28 is to make the second cut upon the workpiece 29. The point at which the rate of travel of the gauge nut 64 and the table 22 will be decreased in relation to the final position will vary with the circumstances, depending upon the accuracy with which the shift from fast rate to slow rate of travel can be accomplished. For example, the rapid rate of travel of the table 22 must be terminated at a point further from the final position than is necessary for the gauge nut 64 since the shift cannot be accomplished as accurately with the table due to its greater weight, assuming that both the table 22 and the gauge nut 64 are traveling at the same rate in their initial movements.

As shown schematically in Fig. 4, the pulsing dial tabulating mechanism 61 on the control panel 60 is operatively connected to actuate an electronic counter mechanism 66 which may be preset by operation of the dial to record the numerical expression of the desired displacement. The counter mechanism 66 is in turn electrically connected with a photoelectric scanning device 67 that cooperates with a cylindrical dial 68 secured to the forward end of the gauge screw 63 and presenting on its periphery indicia or graduations representing increments of movement of the gauge nut 64, in this instance in units of thousandths of an inch. After the counter mechanism 66 has been preset by the tabulator dial 61 to record the desired displacement in numerical terms, the gauge screw 63 is automatically rotated at rapid rate through operation of a primary motor 71 to advance the gauge nut 64 toward the desired position, the indicia on the dial 68 being scanned and counted as the screw rotates. As the nut 64 approaches the predetermined position, indicated by the number of scale indicia counted, the primary motor 71 is automatically deenergized and a secondary motor 72 comes into operation to effect slow movement of the nut precisely to the predetermined position as indicated by the number of graduations on the dial 68 scanned by the scanning mechanism 67 which controls the preset counter mechanism 66.

The table 22 is then advanced through operation of the main motor 31, as previously explained, until a stop dog 74 on the table engages a pretrip device 75 on the nut which deenergizes the motor 31 and starts the inching motor 65. As movement of the table 22 continues at slow speed by operation of the inching motor, the stop dog 74 engages the nut 64 and causes it and the gauge screw 63 to move endwise as a unit. Endwise movement of the screw 63 actuates a switch 76 which stops the inching motor 65 with the table positioned precisely at the predetermined distance from its initial position.

Although the data impressed upon the tabulating mechanism by operating the dial pulser 61 passes through both the counter 66 and the scanner 67 in effecting a positioning operation, it does so in the form of a numerical expression representing a required displacement in increments and is thus transmitted without error in the same manner that similar numerical data is operated upon in a calculating machine. The only part of the apparatus subject to dimensional error is the screw and nut gauging mechanism and this mechanism is so constructed as to reduce the possibility of error to the desired minimum.

As appears in Fig. 1, the gauge screw 63 is disposed beneath the rear edge of and as close as practicable to the movable table 22, being positioned parallel with the direction of table movement in manner to achieve the greatest possible kinematic advantage. Since the accuracy of the entire system is dependent upon the gauge screw mechanism, the gauge screw itself is made as accurately as possible and is arranged to cooperate with other elements of the system in the most direct and positive manner. To this end, the gauge screw 63 is arranged to move endwise in the direction of movement of the table 22 when the stop dog 74 on the table engages the gauge nut 64, whereby the control switch 76 mounted in an end bracket 80 on the end of the machine bed 21 is operated directly without lost motion in stopping the table at the precise predetermined position.

As best shown in Figs. 4, 5 and 6, the gauge screw 63 is supported at its forward end within the end bracket 80 in a cradle 81 that is mounted at its respective ends upon ball bearings 82 disposed to contact the cradle ends in a horizontal plane through the axis of the screw and providing for frictionless horizontal endwise movement of the screw. The end portion of the screw which engages the cradle is provided with an annularly ribbed journal or step bearing 83, the ribs of which interfit with complementary annular grooves constituting a cooperating bearing surface in the cradle 81. A similarly grooved bearing cap 84 is adjustably mounted on the cradle above the journal 83 and may be tightened to effect the desired degree of snugness between the ribbed journal and its bearing to obviate any lost motion therebetween, as more fully set forth in copending application Serial No. 71,082 filed January 15, 1949, which has since issued as U. S. Patent No. 2,694,961, dated November 23, 1954. To maintain the screw 63 in the desired axial position prior to a tripping operation, the cradle 81 is urged rearwardly by a spring 85, which forces it against a positive stop 86 on the bed 21 as illustrated in Fig. 4 to establish the initial axial position.

As shown in Fig. 5, axial movement of the screw 63 is transmitted to operate the switch 76 by means of a ball 88 that engages the end of the screw directly and transmits motion to a pivoted arm 89 which in turn operates the switch 76, the arrangement being such that possibility of error is reduced to a minimum. The ball 88 also operates to actuate the stem 90 of a sensitive dial indicator 91 that is disposed in a protecting bracket 92 extending from the end bracket 80 at the end of the machine bed 21 with its stem 90 in axial alignment with the gauge screw 63. As shown, both the stem 90 and the spring 85 act upon the left end of a sliding plug 93 the other end of which engages the ball 88.

The cylindrical graduated dial 68 is mounted directly on the screw 63 adjacent to the journal 83 in manner to constitute therewith a rigid unitary structure whereby rotation of the screw 63 is accurately indicated by movement of the gauge indicia past the scanning device 67.

Since the gauge screw 63 is of considerable length, the weight of the gauge nut 64 is not permitted to be carried by the screw but instead the nut is arranged to be supported for sliding movement along a guide rail 95 fixed to the bed 21 parallel with the direction of movement of the table 22, the arrangement being such that the nut 64 supports the screw 63 and prevents deflection or sagging of the screw which otherwise might occur to an objectionable degree. As best shown in Figs. 5 and 7, the rail 95 presents spaced upper and lower vertically disposed track ways 96 and 97 on its forward face which are engaged by sets of rollers 98 and 99, respectively, rotatably mounted on vertical axes in the back of the gauge nut 64. The nut 64 is suspended from the top of the guide rail 95, in manner to be urged toward the vertical track ways 96 and 97, by means of a third set of rollers 102 which are angularly disposed and ride upon a cooperating track way 103 that is inclined inwardly and downwardly from the top edge of the rail 95, the arrangement being such that the angularly related track ways on the rail constrain the nut to movement along a straight horizontal line disposed precisely parallel with the axis of the measuring screw.

In order to accommodate the endwise tripping movement of the screw 63, its rearward end is rotatably journalled in a bearing block 106 shown in Fig. 9, that is generally similar in shape to the nut 64 and is similarly mounted for sliding movement on the guide rail 95 by spaced sets of vertically journalled rollers 107 and 108 which engage the vertical guide surfaces 96 and 97, respectively, and by inclined upper rollers 109 which ride upon the inclined track way 103, as shown in Fig. 9. By this arrangement, the gauge screw 63, together with its forward supporting cradle 81, its rear bearing block 106 and the gauge nut 64 is mounted throughout upon anti-friction bearings in manner to be freely movable in the direction of its axis. As shown, the gauge screw 63 and the guide rail 95 with their associated parts, are protected by a guard plate 111 that is secured to the top of the machine bed 21 and extends outwardly therefrom with a downward inclination to shield the gauge mechanism from falling debris.

As previously mentioned, when the stop dog 74 approaches the gauge nut 64 as the table 22 advances along the bed 21, it first engages the pretrip device 75 that operates to reduce the speed of movement of the table. As best shown in Figs. 5 and 8, the pretrip device 75 comprises a lever arm 114 that is pivotally mounted in manner to project horizontally from the nut 64 and presents on its outer end an inclined cam surface 115 disposed to be engaged by a cooperating cam surface 116 on the bottom of the stop dog 74. As best shown in Fig. 8, the arm 114 slidably engages a splined pretrip shaft 117 that is rotatably mounted above and parallel with the gauge screw 63 and constitutes the pivot axis for the arm 114. As shown in Fig. 6, the pretrip shaft 117 is provided at its forward end within the end bracket 80 of the bed 21 with an upwardly extending arm 118, the upper end of which engages a control switch 119, the arrangement being such that when the shaft 117 is pivoted by engagement of the stop dog 74 with the cam surface 115 on the end of the arm 114, the arm 114 is depressed to turn the shaft 117 thereby moving the arm 118 and actuating the switch 119 which functions to deenergize the main motor 31 and start the table inching motor 65.

As the table 22 advances at the reduced rate of speed, an abutment 121 on the trip dog comes into engagement with a cooperating abutment 122 on the nut 64 and carries the nut forward, together with the gauge screw 63 and the other mechanism, as previously explained, to actuate the stop switch 76. Since the distance through which the nut 64 must move to effect actuation of the switch 76 remains constant from one tripping operation to another, the trip dog 74 is so positioned that this movement or constant error is taken into account and the actual stopping of the table occurs precisely at the predetermined position. In order to avoid injury to the gauging mechanism should the table accidentally overrun the stop position, the tripping abutment 121 is slidably mounted in the trip dog 74, as shown in Fig. 5, and is held in its forward position by means of a relatively strong spring 123, the arrangement being such that the abutment 121 may telescope into the trip dog if the abutment meets with sufficient resistance to overcome the force exerted by the spring.

The gauge nut 64 is preferably of the anti-backlash type in which an adjusting element 126 is arranged to be rotated relative to the main body of the nut for effecting snug engagement with the threads of the gauge screw 63. As shown in Fig. 7, adjustment of the nut is effected by turning a pair of adjusting screws 127 that engage opposite sides of the end of a radial arm 128 projecting from a collar 129 that encircles the adjusting element 126 and is provided with internal serrations which engage complementary external serrations on the periphery of the adjusting element 126 in well known manner.

As previously mentioned, the gauge screw 63 is made as accurately as possible in order to reduce the possibility of error in the gauging system to a minimum. In accordance with a modification of the gauge screw and nut mechanism illustrated in Figs. 10 and 11, the possibility of error may be further reduced by compensating for any error which may exist in the thread of the screw. In the modified nut structure, the tripping abutment 121 on the trip dog 74 engages a movable abutment 132 that is threaded in the body of the nut for adjustment longitudinally thereof. At its other end, the adjustable abutment is fitted with a depending probe arm 133 that carries an inwardly projecting follower element 134, the end of which engages a cam surface 135 formed on the gauge screw at the root of the thread. The cam surface 135 is so formed that it effects rotation of the threaded abutment 132 through action of the arm 133 in manner to advance or retract its abutment engaging end a distance which effects compensation for any inaccuracy which may occur in positioning the nut 64 by turning the screw 63. Utilization of the cam surface 135 to compensate for errors in the thread of the screw offers the advantage of rendering it unnecessary to use an extremely accurate screw. A less expensive screw may be used as its inaccuracies will be adequately compensated for obtaining the same results as would be achieved with a more accurate screw.

For effecting manual rotation of the screw 63 in positioning the gauge nut 64, the screw is provided at its forward end adjacent to the dial 68 as illustrated in Fig. 5 with a gear 137 that is arranged to be actuated by turning a small hand crank 139 which is rotatably mounted on the right end of the end bracket 80, as shown in Figs. 1, 6 and 12 and more fully set forth in the previously mentioned copending application. As the screw is turned by the hand crank 139, the scale on the periphery of the dial 68 may be observed through a window 140 carrying a vernier scale against which the scale of the dial may be read. A counter 143 is operatively connected to be turned by the screw 63, the dial of the counter being positioned adjacent to the window 140 in manner to cooperate with the dial 68 and its vernier in indicating the position of the gauge nut 64, expressed in this instance in inches and tenths of thousandths of an inch.

In order that the gauge screw 63 may be rotated by power in effecting automatic positioning of the gauge nut 64, the screw is provided at its rearward end adjacent to the bearing block 106 with a gear 146. As shown in Fig. 4, the gear 146 on the screw 63 meshes with a gear 147 of a slow speed positioning drive mechanism 148 that is generally similar in construction to the positioning drive mechanism 50 incorporated in the table driving transmission train. The drive mechanism 148 is also provided with a worm wheel 149 having meshing engagement with a driving worm 150 on the shaft of the primary motor 71, the mechanism 148 operating ordinarily as a substantially direct driving connection between the worm wheel 149 and the gear 147, whereby the screw 63 may be rotated at rapid rate in effecting preliminary positioning of the nut 64 through operation of the primary motor 71. The secondary or slow motion motor 72 has fixed on its shaft a worm 152 that has meshing engagement with a worm wheel 153 on the central shaft of the positioning mechanism 148 which operates through reduction gearing within the mechanism to turn the gear 147 slowly for advancing the nut 64 precisely to its predetermined position as established by the scanning device 67 in scanning the scale drum or dial 68 on the screw.

As best shown in Figs. 18 and 19, the photoelectric scanning device 67 is made up of a plurality of scanning units, preferably ten, mounted in the end bracket 80 at the left of the dial 68 with each unit disposed radially of the dial and the several units spaced to cooperate with a segment of the dial in the manner of a vernier. As previously mentioned, the dial 68 carries on its periphery scale markings representing thousandths of an inch of movement of the gauge nut 64, the scanning units being so positioned as to constitute a vernier reading in tenths of thousandths of an inch. Thus, to effect a positioning movement involving a dimension ending in tenths of thousandths of an inch, a scanning unit is selected which is so positioned that when it completes the counting of thousandths of an inch in conjunction with the counter mechanism 66, and the dial 68 stops with the last scale marking in alignment with the scanner unit, the scale markings will not be in register with their initial positions, but will be offset through an amount equal to the angular displacement represented by the tenths of thousandths involved in the measurement.

As shown in Figs. 18 and 19, each scanning unit comprises a light source in the form of an electric bulb 156 that projects light in direction axially of the screw 63 through a condensing lens 157, upon a mirror 158 which reflects the light through a right angle and directs it radially toward the dial 68, through lens 159 and 160. Light reflecting from the dial surface is focused by the lens 160 and 159 in such manner that when a scale mark 161 is in direct alignment with the scanning unit, its image will be projected through a slot 162 in the mirror 158 and a control aperture 163 in an adjustably mounted plate 164 in manner to fall upon a photoelectric tube 165. The plate 164 is so adjusted that when the scale indicium 161 is in exact alignment with the scanning unit, the image of the indicium will coincide with the slot or aperture 163. Preferably, the surface of the scale drum 68 is made reflective whereas the scale indicia 161 are non-reflective. Accordingly, when the image of the scale indicium coincides with the slot 163, the amount of light received by the photoelectric tube 165 is reduced to a minimum. As the dial 68 rotates before the scanning unit, the amount of light received by the phototube 165 is reduced each time an indicium 161 passes the objective lens 160, causing the phototube to impress an electrical impulse upon the counter mechanism 66. In this manner, the scale indicia 161, each representing a thousandths of an inch, are scanned by the scanner 67 and counted by the counter 66 to effect control of movement of the gauge nut 64 through a predetermined distance previously set up in the counter mechanism through operation of the tabulator pulsing dial mechanism 61.

After the gauge nut 64 has been precisely positioned through operation of its power driving mechanism under control of the scanner 67, and the table 22 has been moved to the position established by the gauge nut as previously mentioned, it is desirable to prevent further movement of the table through operation of the hand crank 35 which might unknowingly result in forcing the table against the gauge nut 64 with sufficient force to damage the gauging mechanism. To this end, control mechanism actuated by the pretrip rod 117 is arranged to disconnect the hand crank 35 from the table screw 34 as the table trip dog 74 approaches the gauge nut 64 and to prevent reengagement so long as the dog remains adjacent to the nut. For this purpose, the pretrip shaft 117 is provided, as shown in Fig. 12, with an arm 168 extending to the left within the end bracket 80 substantially at right angles to the switch actuating arm 118. As shown in Fig. 15, the left end of the arm 168 fits within the bifurcated end of an arm 169 pivotally mounted parallel to the trip rod 117 in the end bracket 80, the arrangement being such that when the rod 117 is turned clockwise as seen in Fig. 12, the arm 169 is turned counterclockwise as seen in Fig. 15. The arm 169 is keyed to a shaft 170 rotatably mounted at its ends in bearing blocks 171 depending from the top of the bracket 80. The mid-portion of the shaft 170 is cut away at its upper side, as shown in Fig. 15, to provide a notch 172. When the arm 169 is turned counterclockwise a sufficient distance from the position shown in Fig. 15, a projecting finger 173 of an upwardly extending trigger arm 174 is caused to enter the notch 172 through action of a spring 175. The trigger arm 174 is keyed to a rocking shaft 176 that extends transversely of the machine bed at the bottom of the end bracket 80, as shown in Fig. 12. At its left end, the shaft 176 is provided with an inwardly extending arm 177 shown in Fig. 17, the inner end of which is rounded and engages a notch 178 in the lower end of a vertically disposed pivotally mounted throw-out lever 179. When the rocking shaft 176 is turned by the trigger arm 174 as just explained, the rounded end of the arm 177 moves out of the notch 178 and causes the throw-out lever 179 to pivot clockwise about a pivot point 180 as shown in Fig. 17, which results in its upper end moving to the right to engage an inwardly projecting shaft 181 on the crank 35 and to move the crank outwardly from the bracket 80. This causes clutch teeth 182 on the crank to become disengaged from complementary clutch teeth 183 on a gear 184 rotatably mounted in the bracket 80 concentrically with but independently of the shaft 181. As shown, the gear 184 has meshing engagement with a larger gear 185 that is fixed on the outer end of the table screw 34, whereby the table screw may be operated by the hand crank 35 with mechanical advantage when the clutch teeth are engaged. The rocking shaft 176 is provided at its right end, outside of the bracket 80, with a reset handle 188 by means of which the trigger arm 174 may be withdrawn from the notch 172 in resetting the machine for a subsequent operation.

At the end of a positioning movement when the table has been brought to rest at the predetermined position established through operation of the gauging mechanism, it is desirable that the table driving train be disconnected in order to obviate the possibility of any slight displacement of the table which might otherwise result from residual forces in the power driving train. To this end, the reversing clutch gear 37 is automatically moved to neutral position at the termination of the positioning operation through the action of an electrical solenoid 191 mounted in the left end of the end bracket 80, as shown in Figs. 12 and 16. When the solenoid 191 is energized, at the end of a positioning movement as will be later described, it effects an upward movement of a core elements 192 carrying a depending pivoted link 193. As shown in Fig. 16, the lower end of the link 193 is pivotally connected to the left end of a cam plate 194 that is rotatably mounted on a rocking shaft 195 disposed in the bracket 80 in axial alignment with but independent of the the shaft 176. As the solenoid core moves upward, a cam surface 197 on the arm 194 engages a roller 198 shown in Fig. 12 carried on the forward end of a horizontal arm 199 that is pivotally mounted at the rear of the end bracket 80. This causes the arm 199 to pivot counterclockwise, thereby lifting another roller 201 out of a detent notch in a detent arm 202 which is fixed on the shaft 195, thereby freeing the shaft for turning movement. A pin 203 in the arm 194 then engages the detent arm 202, causing it to turn with the arm 194 in clockwise direction, as seen in Fig. 16. The lower end of the detent arm 202 projects downward into a notch 204 in the control rod 205 which projects rearwardly into the machine bed as shown in Fig. 2, and is operatively connected with the control lever 58. As the detent arm 202 is turned clockwise, it moves to the position shown in Fig. 17, moving the rod 205 rearwardly and shifting the lever 58 and the fork 206 engaging the reversing clutch gear 37 to their central neutral positions.

The shaft 195 is also provided with an inwardly extending arm 207 similar to and disposed beside the arm 177 of the shaft 176. With the detent arm 202 in the neutral position shown in Fig. 17, the rounded inner end of the arm 207 engages the notch 178 of the throw-out lever 179. When the control rod 205 is shifted either to the right or to the left to effect power movement of the table in a corresponding direction, the detent arm 202 pivots in the one or the other direction, causing the end of the arm 207 to move up or down out of the notch 178, thereby tilting the throw-out lever 179 forward and preventing engagement of the hand crank clutch teeth with the clutch teeth of the table screw turning gear 184, thereby avoiding the possibility of the crank being turned by power.

In order to avoid any possibility of the neutralizing solenoid 191 throwing the reversing linkage and reversing clutch gear 37 past the neutral position into reverse, there is provided in the end bracket 80 beneath the solenoid, a movement limiting mechanism shown in detail in Figs. 12 and 14. The control rod 205 has in addition to its endwise movement, a turning movement which is effected by moving the control lever 58 toward or from the machine bed in changing the rate of table movement between feed and rapid traverse as previously mentioned. Within the end bracket 80, the rod 205 is provided with an arm 209, the rod and arm being turned to feed position, as shown in Fig. 12. When the table is to be advanced toward the gauge nut, the lever 58 is moved to the right as seen in Fig. 2, thereby moving the rod 205 to the right and bringing the end of the arm 209 into the position shown in dotted lines in Fig. 13. The lever 58 is then moved to rapid traverse position, causing the rod 205 to turn in clockwise direction as seen in Fig. 12, to effect downward movement of the end of the arm 209 and depress a spring urged pivoted dog 211. When the solenoid 191 is energized at the end of the positioning movement, the lever 58 and the rod 205 are moved to the left as shown in the drawing, whereupon the end of the arm 209 engages the end of another spring pressed dog 212 which prevents movement of the control mechanism past the neutral position.

As shown in Fig. 13, the dogs 211 and 212 are mounted on pivot pins 213 in opposed relationship with their adjacent ends urged upwardly against stop pins 214 by an interconnecting tension spring 215. With the control mechanism in the rapid traverse neutral position after operation of the solenoid 191, the end of the arm 209 is disposed between the ends of the dogs 211 and 212, as shown in full lines in Fig. 13, making it impossible to shift the reversing gear 37 while the rapid traverse drive mechanism is engaged. Thus, to effect a driving connection to the table, the lever 58 must first be moved to feed position, thereby lifting the arm 209 from between the dogs to the position shown in Fig. 12. The control rod 205 is then free to move endwise, permitting the reversing gear to be engaged for effecting movement of the table at feed rate in selected direction. After the table has been started at feed rate, the control lever 58 may be moved to engage the rapid traverse drive, the end of the arm 209 moving downward and depressing one or the other of the dogs 211 or 212. Endwise movement of the control shaft 205, while in the rapid traverse position, is then limited to movement to neutral position by reason of engagement of the end of the arm 209 with the end of the other spring pressed dog.

As previously mentioned, the slow speed positioning drive mechanism 50 for effecting final positioning of the table 22 and the slow speed positioning drive mechanism 148 for effecting final positioning of the gauge nut 64 are generally similar in construction. The table positioning drive mechanism 50 is shown in longitudinal section in Fig. 3, which also serves to illustrate the internal mechanism of the nut positioning mechanism 148. As there shown, the two gears 49 and 51 are shaped to constitute an enclosing casing for the mechanism and are rotatably mounted respectively by large ball bearings 221 and 222, carried by end plates 223 and 224, fixed on a supporting shaft 225. The shaft 225 also has fixed on it a worm wheel 226, shown in Fig. 2, that is engaged by a driving worm 227 on the shaft of the inching motor 65. Formed integrally with the shaft 225 within the mechanism, is a spur pinion 229 that meshes with a pair of diametrically disposed planet gears 230 (only one of which is shown), rotatably mounted in a floating spider 231 that is carried on the shaft 225 by ball bearings 232. The planet gears 230 in turn both mesh with internal annular gears 233 and 234 formed on the inner surfaces of the rims of the enclosing gears 49 and 51. The number of teeth in the two internal gears is different to provide for a differential action, one of the internal gears being provided with two more teeth than the other. The arrangement is such that when the gear 51 is held stationary by reaction through the transmission mechanism 56, which includes self-locking gearing, the other gear 49 will be caused to progress by two teeth of the internal gear for each revolution of the spider 231 and planetary gears 230 within the stationary gear 51. Since it requires two revolutions of the shaft 225 to effect one revolution of the spider, it follows that the gear 49 will be advanced one tooth of its internal gear 233 for each revolution of the shaft 225 by the inching motor 65. By reason of the high ratio of speed reduction effected by this mechanism, one revolution of the inching motor 65 results in moving the table 22 through only approximately five ten-thousandths of an inch.

Referring again to the previously mentioned assumption that an initial cutting operation has been completed and a second operation is to be effected at a precisely predetermined distance from the first, the result of the first operation may be illustrated by a cylindrical opening 241 that has been bored out in the workpiece 29 by the cutter 28 as shown in Fig. 1. A second cylindrical opening 242, to be bored out, illustrates the second operation, the distance between the centers of the two openings being, in this particular example, precisely 19.2528 inches. After the opening 241 has been bored, the cutter 28 is withdrawn and the gauge nut 64 is moved manually to its initial position with the aid of the dial indicator 91. The control lever 58 is then set for rapid traverse movement in forward direction and the operator sets up the numerical expression representing the desired displacement of the workpiece 29 on the tabulator 61 by dialing the digits of the numerical representation of the displacement. In this instance, he dials "1-9-2-5-2-8," as in dialing a telephone number.

Figure 20:
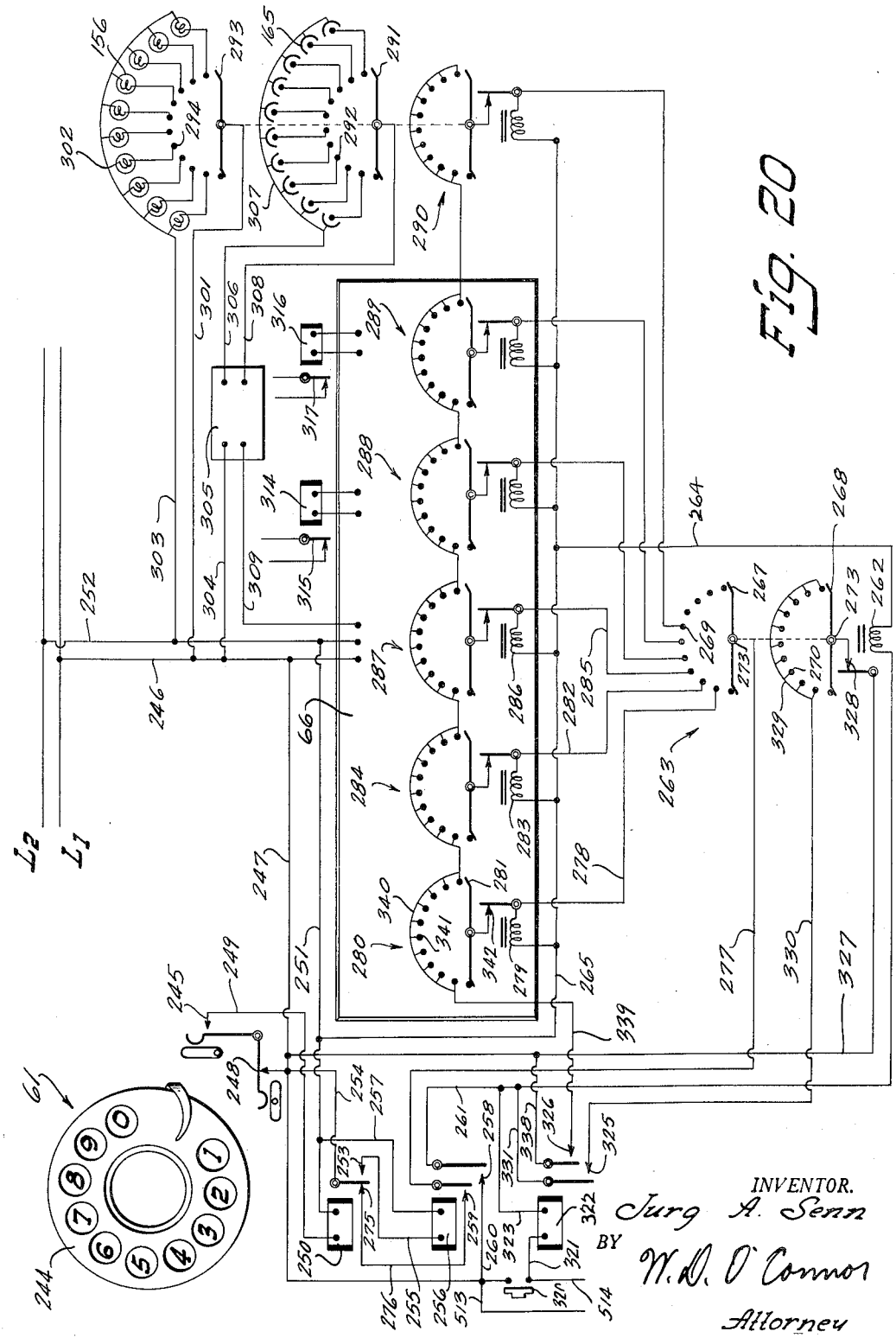
Fig. 20 is a schematic wiring diagram of the electrical circuit for actuating the electronic counting apparatus.

Referring now more particularly to the circuit diagram shown in Fig. 20, the electric power for setting the electronic counter mechanism 66 is obtained from a source represented by line conductors $L_1$ and $L_2$. Upon moving a movable dial element 244 of the tabulator 61 in commencing a dialing operation, a contact 245 is closed which completes a circuit from the line conductor $L_1$ through a conductor 246, another conductor 247 leading to an impulse contact 248 and the closed contact 245 and thence through a conductor 249 to a pulsing relay 250. From the pulsing relay 250, the current flows into a conductor 251 and a conductor 252 leading back to the other line conductor $L_2$.

Completion of the foregoing circuit causes energization of the pulsing relay 250 to close its contact 253 and establish a circuit from the line conductor $L_1$ through the conductors 246 and 247 and a conductor 254 leading to the closed contact 253 thence through a conductor 255 to a time delay relay 256. From the time delay relay 256, the current returns to the line conductor $L_2$ through a conductor 257 and the conductors 251 and 252. Energization of the time delay relay 256 effects closing of its contacts 258 and 259, the closed contact 258 establishing a circuit from the line conductor $L_1$ through the conductors 246 and 247 and a conductor 260 leading to the contact 258. From the contact 258 the current is carried through a conductor 261 to an operating coil 262 of a stepping switch 263 and thence through a conductor 264 to a conductor 265 and the conductors 251 and 252 leading back to the line conductor $L_2$.

The stepping switch 263 is comprised of a pawl and ratchet mechanism 266, illustrated diagrammatically in Fig. 4, arranged to advance a pair of wipers 267 and 268 in steps along two series of contacts 269 and 270 respectively, located to cooperate with the wipers. Each impulse imparted to the coil 262 serves to actuate a pawl 271 to move a ratchet wheel 272 one notch and consequently advance both wipers 267 and 268 one step to the succeeding contact of their respective series. The wipers 267 and 268 are mounted on a single shaft 273 to move in unison when actuated by the pawl and ratchet mechanism 266. A dotted line is shown in Fig. 20 between the wipers 267 and 268, constituting the representation of their shaft 273 to indicate that both wipers are mounted on one shaft.

Energization of the coil 262 advances the stepping switch 263 one step, causing the wiper 267 thereof to contact the first of the series of decade selector switch contacts 269. This establishes a circuit leading from the line conductor $L_1$, through the conductors 246 and 247, the conductor 254, a normally closed contact 275 of the pulsing relay 250, through a conductor 276 leading to the closed contact 259 of the time delay relay 256. The contact 259 is connected to the wiper 267 of the stepping switch 263 by a conductor 277, permitting the current to flow through the wiper 267 to the first contact of the series of decade selector contacts 269. From the first of the contacts 269, a conductor 278 leads to an operating coil 279 of a decade stepping switch 280 which operates to set the first decade of the electronic counter 66, the coil being connected at its other end to the conductor 265 which carries the current to the conductor 251 leading to the conductor 252 to return to the line conductor $L_2$. The stepping switch 280 is similar in construction and operation to the previously described stepping switch 263.

The electronic counter 66 is made up of five decade registers arranged in cascade relationship, the first unit registering increments of ten inches each, the second, increments of inches, the third, increments of tenths of inches, the fourth, increments of hundreds of inches and, the fifth, increments of thousandths of inches. By this arrangement, it is possible to set up in the electronic counter any required dimension, up to one hundred inches in this particular instance, and it is evident that the series of decade registers could be arranged to accommodate any desired range of measurement expressed in any system of measuring units whether linear or angular.

With the circuit established to the first decade stepping switch 280 upon the initial movement of the dial 244, the operator continues with the dialing of the first digit, in this instance the numeral "1." As will be seen in the drawings, the numerals on the dial of the tabulator 61 are arranged in inverse order. Consequently, when the numeral "1" is dialed, the impulse contact 248 operates to transmit ten impulses through the circuit to the operating coil 279 of the first decade stepping switch 280. This causes a wiper 281 of the stepping switch 280 to move away from the zero point and over nine other points of its contact segments, which in effect results in cancelling nine counts in the first decade of the counter 66, leaving the desired number of one count set up in the counter.

Upon moving the tabulator dial 244 a second time in dialing the second digit "9," the contact 245 is again closed, thereby closing the contact 253 of the pulsing relay 250 and again energizing the time delay relay 256 to close its contact 253 and thereby again energize the operating coil 262 of the decade selector stepping switch 263. Energization of the coil 262 causes the wiper 267 to move to the second of its contacts 269 which establishes a connection through a conductor 282 to an actuating coil 283 of a second decade stepping switch 284, the coil being connected at its other end to the conductor 265 leading to the conductor 251 and thence to the conductor 252 which carries the current back to the line conductor L₂.

In completing the dialing of the numeral "9," the impulse contact 248 is opened twice, thereby impressing two impulses on the operating coil 283 of the second decade stepping switch 284 and moving its wiper arms away from the zero position to the "9" position. This results in neutralizing one count in the second decade counting unit and leaving the unit set at nine counts, representing in this instance nine inches in the required dimension.

Similarly, when the next digit, in this instance "2," is dialed, the first movement of the dial causes the decade selector switch 263 to advance another step, thereby effecting a connection through a conductor 285 to an operating coil 286 of a third decade stepping switch 287. The impulse contact 248 then operates through the impulse relay 250 to advance the stepping switch 287 in manner to cancel all the units in the third decade of the counter 66 excepting two. Upon dialing the next digit "5," a fourth decade stepping switch 288 cancels half of the available units in the fourth decade of the counter, leaving it with a net capacity of five units. Likewise, when the fifth digit "2" is dialed, a fifth decade stepping switch 289 establishes a capacity of two counts in the fifth decade of the counter, representing two thousandths of an inch.

Upon dialing the last digit, in this instance "8," the selector switch 263 is turned to effect a connection with a last decade stepping switch 290. This last switch 290 is not connected with the counter 66 but operates to select one or another of the photoelectric tubes in the scanning device 67 to actuate the counter 66, which by reason of the vernier effect of its position establishes the final increment of measurement in tenths of thousandths of an inch. As shown in the drawing, a wiper 291 of the switch 290 operates over a contact segment 292, the contacts of which are connected respectively to the photoelectric cells 165 of the ten scanning units. A second wiper arm 293 of the switch 290 cooperates with the wiper 291 and operates over a contact segment 294, the points of which connect with the illuminating lamps 156 associated with the respective scanning units, the arrangement being such that only a selected one of the ten scanning units is illuminated and connected to effect actuation of the counter 66.

In this instance, the last number dialed is the numeral "8" and the wipers of the stepping switch 290 would advance three steps to the contact connected with the photoelectric tube located to effect the desired final increment of movement of .0008 inch. The wiper 293 moves to illuminate the lamp arranged to cooperate with the selected one of the photoelectric tubes 165. Thus, upon dialing the last digit of the numerical expression representing the desired distance of movement, a circuit is established from the line conductor L₁ through the conductor 246, a conductor 301 and the wiper 293 and thence to the selected one of the contacts 294 leading to its complementary lamp 156. From the lamp 156, the current is carried through a return conductor 302 and a conductor 303 to the conductor 252 leading back to the line conductor L₂.

Another circuit is established to the selected photoelectric tube 165, originating at a source represented by the line conductor L₁, through the conductor 246 to a conductor 304 leading to a pulse shaper 305. The pulse shaper is provided in the circuit to sharpen and amplify the impulses received from the selected photoelectric tube 165 as it is affected by the dial 68 rotating with the screw 63. From the pulse shaper 305, the current flows through a conductor 306 to a conductor 307 leading to the cathode of the selected photoelectric tube 165. From the cathode of the photoelectric tube, the current flows to its anode which is connected to its complementary contact 292 and thence through the wiper 291 to a conductor 308 leading back to the pulse shaper 305. The current then continues through the pulse shaper 305 into a conductor 309 connected to the counter mechanism 66. The electric impulses effected by the action of the dial 68 on the photoelectric tube 165 function to actuate the counter 66, the current flowing through the counter and returning to its source represented by the line conductor L₂ through the conductor 252.

As the dial 68 revolves with the gauge screw 63, it varies the intensity of illumination striking the selected photoelectric cell once for every .001 inch of movement of the nut 64, causing the photoelectric cell to transmit impulses to the counter 66 through the pulse shaper 305. These impulses wipe out those counts in the counter 66 which were not eliminated by actuation of the tabulator 61. When the movement of the gauge nut 64 is first initiated, it is driven by the primary motor 71 at a rapid rate. As it approaches the end of the movement, the counter 66 actuates a relay 314 to open a contact 315 and break the circuit to the primary motor. At this point, the secondary motor 72 takes over to drive the gauge nut 64 at a slow rate to its final position. When all the counts remaining in the counter 66 have been wiped out by the impulses received from the photoelectric cell 165, a second relay 316 is actuated by the counter 66 to open a contact 317 and break the circuit to the secondary motor 72. Deenergization of the secondary motor 72 terminates the movement of the gauge nut 64 at the precise position desired and the main table driving motor 31 is then automatically energized to initiate movement of the table 22.

If an error has been made in dialing the numerical expression and it is desired to redial the number, it is necessary to first reset the wipers of the stepping switches to their zero position and in doing so, the counter 66 is automatically reset. After completing a positioning movement, it is also necessary to zero the stepping switches, but this is accomplished automatically after the table is stopped in a manner to be later described.

To manually zero the stepping switches, a push button 320, shown in Figs. 20 and 22, is actuated to establish a circuit from the line conductor L₁ through the conductors 246 and 247 to the closed contacts of the push button 320 and thence through a conductor 321 leading to a time delay relay 322. From the time delay relay 322, the current flows into a conductor 323 to the conductor 261 leading to the operating coil 262 of the stepping switch 263. From the coil 262, the current flows through the conductors 264 and 265 to the conductor 251 returning to the source represented by the line conductor L₂ through the conductor 252. Completion of the foregoing circuit energizes the time delay relay 322 causing it to close both of its contacts 325 and 326.

The closing of contact 325 retains the coil 262 energized through establishment of a circuit from the line conductor L₁ through the conductors 246 and 247 to a conductor 327 leading to a normally closed contact 328 of the coil 262 and thence through the wiper 268 to one of the contacts 270 through a conductor 329, which interconnects all of the contacts 270, to a conductor 330 leading to the closed contact 325. From the contact 325, the current flows into a conductor 331 through the conductor 261 leading to the coil 262 and from the coil 262 through the conductor 264 to the conductor 265, returning to the line conductor L₂ via the conductors 251 and 252. Energization of the coil 262 opens the contact 328 to break the circuit to the coil 262 and deenergize it whereupon the contact 328 closes again to reestablish the circuit and energize the coil 262. This cycle repeats itself, causing the contact 328 to repeatedly open and close, resulting in a series of electrical impulses to be imparted to the coil 262 to actuate the wipers 267 and 268 from one to the other of their cooperating contacts 269 and 270, respectively, until the wipers reach the zero position shown in Fig. 20, when the circuit to the coil 262 is broken by virtue of the fact that the wiper 268 is not touching any of its cooperating interconnected contacts 270.

Energization of the time delay relay 322 also functions to zero the stepping switches which set up the numerical expression and, consequently, wipe out any counts which may be set up in the counter 66 if the push button 320 is actuated after a dialing operation but before movement of the gauge nut 64 is initiated. Thus, closing of the contact 326 by energization of the time delay relay 322 establishes a circuit from the line conductor L1 through the conductors 246 and 247 to the conductor 327 and thence through a conductor 338 leading to the closed contact 326. From the closed contact 326, the current flows through a conductor 339 to a conductor 340 leading to a series of interconnected contacts 341 of the stepping switch 280. From one of the contacts 341, the current is transmitted through the wiper 281 to a normally closed contact 342 of the coil 279 and thence through the conductor 278 leading to the coil 279 of the stepping switch 280. From the coil 279, the current flows into the conductor 265 and thence to the conductors 251 and 252 leading back to the other line conductor L2.

Energization of the coil 279 results in opening the normally closed contact 342 to break the circuit and deenergize the coil 279, permitting the contact 342 to close again and reestablish the circuit. This cycle repeats itself in the same manner as described for the stepping switch 263 to impart a series of electrical impulses to the coil 279 and advance the wiper 281 in steps to each succeeding one of its contacts 341 until the wiper reaches the zero position shown in Fig. 20, where it is free of the contacts and breaks the circuit to the coil 279. The stepping switches 284, 287, 288, 289 and 290 have interconnected contacts that are similarly connected to the conductor 340 and the switches are reset to zero in the same manner as described for the stepping switch 280.

Figure 21:
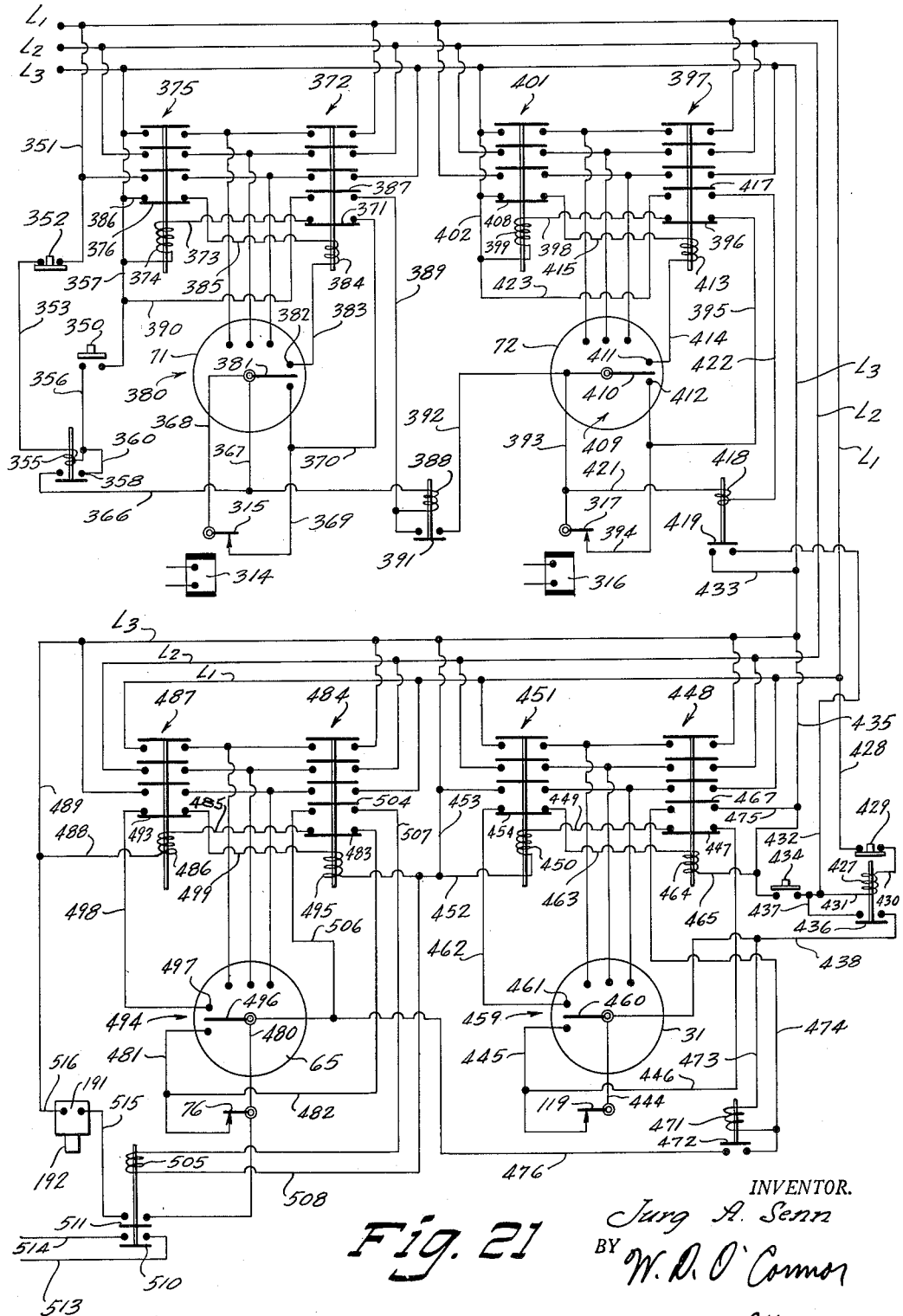
Fig. 21 is a schematic wiring diagram of the electrical control circuit for regulating the movement of the table in the positioning operation; and, Fig 22 is a view in front elevation of the control panel for the positioning mechanism.

After the desired movement is set up in the counter 66 by dialing the numerical expression representing the distance of movement on the tabulator 61, the gauge nut primary motor 71 is energized by actuating a start push button 350 shown in Figs. 21 and 22 to move the gauge nut 64 at rapid rate through the first portion of its movement. As illustrated in the electrical circuit diagram shown in Fig. 21, electrical energy for operating the machine is derived from a power source represented by three phase line conductors L1, L2 and L3. Upon actuating the push button 350, a circuit is established from the line conductor L1 through a conductor 351 to a normally closed stop push button 352 provided in the circuit to deenergize either gauge nut motor 71 or motor 72 while they are operating to move the gauge nut 64. From the stop push button 352, the current flows through a conductor 353 leading to a relay 355 and from the relay 355 to a conductor 356, through the closed push button 350 and thence through a conductor 357 to return to its source represented by another line conductor L3. Energization of the relay 355 closes its contact 358.

Upon closing of the contact 358, a circuit is established from the line conductor L1 through the conductor 351 to the stop push button 352 and thence through the conductor 353, the relay coil 355 and the conductor 360 leading to the closed contact 358. From the closed contact 358, the current proceeds through the conductor 366 to a conductor 367 and thence through a conductor 368 leading to the closed contact 315 of the relay 314 which cooperates with the counter 66. From the contact 315, the current flows into a conductor 369 connected to a conductor 370 through a normally closed contact 371 of a reverse motor control switch 372 and then through a conductor 373 leading to a coil 374 of a forward motor control switch 375, returning to the line conductor L3 through the conductor 357.

This circuit also constitutes a holding circuit for the relay coil 355 whereby it will remain energized to retain its contact 358 in the closed position after the start push button 350 is released. In order to open the relay contact 358 before the cycle is completed, the circuit may be broken by depressing the stop push button 352.

Energization of the coil 374 actuates the forward motor control switch 375 to close its contacts connecting the line conductors L1, L2 and L3 to the gauge nut primary motor 71 to energize the motor in a forward direction. A normally closed contact 376 is connected in the reverse control circuit to the motor 71 and arranged to operate with the switch 375 so that when the contacts connecting the power source for forward rotating of the motor 71 are closed, the contact 376 is open to break the circuit controlling the reverse operation of the motor 71.

The motor 71 is provided with a plugging switch 380 to apply a braking action to the motor when the coil 374 is deenergized. The plugging switch 380 includes an arm 381 having electrical connection with the conductor 367 and arranged to operate with the motor shaft, so that when the motor 71 is operating in a forward direction, the arm 381 is pivoted upward from the position shown in Fig. 21 to connect with a contact 382 in the reverse control circuit, but does not affect the circuit when the motor is being driven in the forward direction because it is broken by the open contact 376. As the gauge nut 64 approaches its final position, the counter 66 actuates the relay 314 to open the contact 315 and break the circuit to the coil 374. Deenergization of the coil 374 results in opening the contacts of the switch 375, connecting the power source to the motor 71 and closing the contact 376 to complete the reverse control circuit of the motor.

Thus, a circuit is established from the line conductor L1 through the conductor 351 and the closed push button 352, through the conductor 353, the relay 355 and the conductor 360 to the closed contact 358, and then through the conductors 366 and 367 leading to the arm 381 of the plugging switch 380. Immediately after the coil 374 is deenergized, the motor shaft continues to rotate in the forward direction due to its moment of inertia so that the arm 381 remains in its upward position connecting with the contact 382. The current therefore flows from the arm 381 to the contact 382 into a conductor 383 leading to a coil 384 of the motor reverse control switch 372. From the coil 384, the current is transmitted through a conductor 385 to the closed contact 376 and thence through a conductor 386 connected to the conductor 357 leading back to the line conductor L3.

Completion of the foregoing circuit energizes the coil 384 to actuate the switch 372 and close its contacts connecting the line conductors L1, L2 and L3 to the motor 71 for its reverse rotation. A contact 387 operating with the switch 372 is also closed and the contact 371 connected in the forward control circuit is opened to break its circuit and insure against any possibility of the coil 374 being energized for forward rotation of the motor. Closing of the contact 387 completes a circuit from the line conductor L1 through the conductor 351 to the closed push button 352 thence through the conductor 353, the relay 355 and the conductor 360 leading to the closed contact 358. From the closed contact 358, the current flows into the conductor 366 leading to a relay 388 and thence into a conductor 389 to the closed contact 387 from which the current is carried by a conductor 390 to the conductor 357 leading back to the line conductor L3.

The switch 372 is closed only momentarily, however, since the reversing current applied through its contacts to the motor 71 functions to stop the forward rotation of the motor and when this occurs, the arm 381 drops away from the contact 382 to break the circuit to the coil 384 and open the switch 372. The momentary energization of the relay 388 is sufficient however to close its contact 391 and establish a holding circuit to energize the gauge nut secondary motor 72. The holding circuit originates at the line conductor L1 and proceeds through the conductor 351 to the closed push button 352 and thence through the conductor 353, the relay 355 and the conductor 360 leading to the closed contact 358. From the closed contact 358, the current proceeds through the conductor 366, through the coil 388 and the conductor 389 to the closed contact 391 and thence through a conductor 392, and another conductor 393 leading to the contact 317 of the relay 316. From the contact 317, the current flows into a conductor 394 connected to a conductor 395 leading to a normally closed contact 396 which is arranged to operate with a reverse motor control switch 397. The current then flows from the closed contact 396 through a conductor 398 to an operating coil 399 of a forward motor control switch 401 and thence through a conductor 402 leading back to the line conductor L3.

The switch 401 is actuated upon energization of the coil 399 to close its contacts connecting the line conductor L1, L2 and L3 to the motor 72 and initiate its forward rotation. Actuation of the switch 401 also opens a normally closed contact 408 to break the reverse control circuit of the motor 72 to preclude actuation of the reverse motor control switch 397. The motor 72 is also provided with a plugging switch 409 to apply a braking action to the rotation of the motor when the circuit is broken. The plugging switch 409 is comprised of an arm 410 arranged to pivot with the shaft of motor 72 and a pair of contacts 411 and 412. When the shaft of motor 72 is revolving in the forward direction, the arm 410 is pivoted upward from the position shown in Fig. 21 to connect with the contact 411 and, when the motor shaft is rotating in the reverse direction, it pivots the arm 410 to connect it with the contact 412.

With the switch 401 actuated to produce forward rotation of the motor 72, the arm 410 connects an operating coil 413 of the reverse motor control switch 397 to the line conductor L1, the circuit extending through the conductor 351, the closed push button 352, the conductor 353, the coil 355, the conductor 360, the closed contact 358, the conductor 366, the relay 388, the conductor 389, the closed contact 391, the conductor 392, the arm 410, the contact 411 and a conductor 414 leading to the coil 413. However, the circuit is broken by the contact 408 which is opened with actuation of the switch 401, it being connected to the coil 413 by a conductor 415. The motor 72 is therefore supplied with current for forward rotation without interference until the last count is eliminated from the counter 66 when it actuates the relay 316 to open the contact 317 and break the circuit to the operating coil 399 of the switch 401.

With deenergization of the coil 399, the switch 401 is again actuated to open the contacts connecting the power source to the motor 72 and to close the contact 408. Since the motor 72 continues to rotate after its source of power has been disconnected due to its moment of inertia, the arm 410 will remain connected to the contact 411. Therefore, closing of the contact 408 establishes the circuit of the coil 413 by connecting it through the conductor 415 to the conductor 402 leading back to the line conductor L3.

With energization of the coil 413, the switch 397 is actuated to close the contacts connecting the line conductor L1, L2 and L3 to the motor 72 for reverse rotation as well as a contact 417. The normally closed contact 396 is opened by actuation of the switch 397 to break the circuit to the operating coil 399 of the switch 401 and insure against simultaneous actuation of the switches 397 and 401. The switch 397 is closed only momentarily however, just sufficient for the power producing reverse rotation of the motor 72 to stop the forward rotation. When forward rotation is terminated, the arm 410 is pivoted away from the contact 411 to break the circuit to the coil 413 and permit the switch 397 to revert to its open position.

The momentary closing of the contact 417 energizes a time delay relay 418 to effect closing of its contact 419 by completing a circuit from the line conductor L1 through the conductor 351, the closed push button 352, the conductor 353, the relay 355, the conductor 360, the closed contact 358, the conductor 366, the relay coil 388, the conductor 389, the closed contact 391, the conductors 392 and 393 and a conductor 421 leading to the time delay relay 418. From the relay 418, the current proceeds through a conductor 422 to the closed contact 417 and thence through a conductor 423 to return to the line conductor L3 through the conductor 402.

Closing of the contact 419 with energization of the time delay relay 418, establishes a circuit to a relay 427 of the control circuit for the main table driving motor 31. The circuit originates with the line conductor L1 and proceeds through a conductor 428 to a normally closed stop push button 429 provided to deenergize either motor 31 or 65 while they are in operation. From the stop push button 429, the current proceeds into a conductor 430 leading to the relay coil 427 and thence through a conductor 431 to a conductor 432 leading to the closed contact 419 which is connected to the line conductor L3 by a conductor 433. A start push button 434 is provided for manually initiating power movement of the table 22 by energizing the relay 427. Actuation of the push button 434 completes a circuit from the line conductor L1 through the conductor 428, the stop push button 429 and the conductor 430 leading to the relay coil 427. From the relay coil 427, the current flows into the conductor 431 to the closed start push button 434 and thence through a conductor 435 to the line conductor L3.

Energization of the relay 427 results in the closing of its contact 436 to establish a holding circuit for retaining the contact in the closed position after the time delay relay 418 permits opening of the contact 419 or the start push button 434 is released, either of which may occur shortly after the circuit is initially established. The holding circuit maintains the circuit from the relay 427 by transmitting the current from he conducor 431 through a conductor 437 and thence through the closed contact 436 to a conductor 438 leading to the control circuits of the motors 31 and 65. From the conductor 438, the current flows into a conductor 444 to the control switch 119 and thence through a conductor 445 and a conductor 446 leading to a normally closed contact 447 of a reverse motor control switch 448. From the closed contact 447, the current proceeds into a conductor 449 to a coil 450 of a forward motor control switch 451 and thence through a conductor 452 to a conductor 453 leading to the line conductor L3 to complete the circuit.

Energization of the coil 450 actuates the forward motor control switch 451 to close its contacts connecting the power source L1, L2 and L3 to the motor 31 for forward rotation and opens a contact 454, which is part of the reverse motor control circuit, to insure that power for reverse rotation of the motor 31 is not connected while the switch 451 is in its closed position. The motor 31 is provided with a plugging switch 459 identical to the plugging switches 380 and 409 operating with the motors 71 and 72 and previously described. With the motor 31 operating in the forward direction, an arm 460 of the plugging switch 459 is pivoted upward of the position shown in Fig. 21, to connect with a contact 461 which would complete the reverse control circuit except for the fact that the contact 454 is open.

With the switch 451 in its closed position, the table 22 will continue its movement in a forward direction at rapid traverse rate until the stop dog 74 actuates the pretrip control switch 119 to break the circuit to the actuating coil 450, permitting the switch 451 to return to its open position as shown in Fig. 21, and close the contact 454. Although the source of power for forward rotation is disconnected, the motor 31 continues to rotate due to its moment of inertia, retaining the arm 460 in the upward position to connect with the contact 461. Thus, with the closing of the contact 454, a circuit is established from the line conductor L1 through the conductor 428, the push button 429, the conductor 430, the relay 427, the conductor 431, the conductor 437, the closed contact 436, the conductor 438, the arm 460, the contact 461, a conductor 462, the closed contact 454, a conductor 463 leading to a coil 464 of the reverse motor control switch 448. From the coil 464, the current returns to the line conductor L3 through a conductor 465 and the conductor 435.

With energization of the coil 464, the switch 448 is actuated to close its contacts connecting the power source L1, L2 and L3 to the motor 31 for its reverse rotation. Actuation of the switch 448 also closes a contact 467 and opens the contact 447 to lock out the forward control circuit. The switch 448 functions to stop the forward rotation of the motor 31, but before reverse rotation can occur, the coil 464 is deenergized with consequent opening of the switch 448 due to the fact that when the forward rotation of the motor 31 ceases, the arm 460 of the plugging switch 459 drops to its neutral position shown in Fig. 21, to break the circuit to the coil 464.

The momentary closing of contact 467 is sufficient however to energize a relay 471 and close its contact 472 by establishing a circuit from the line conductor L1 through the conductor 428, the push button 429, the conductor 430, the relay 427, the conductors 431 and 437, the closed contact 436, the conductor 438, a conductor 473, the relay 471, a conductor 474, the closed contact 467, a conductor 475 and the conductor 435 leading to the line conductor L3. Closing of the contact 472 establishes a holding circuit to maintain the relay 471 energized after the contact 467 is opened by transmitting the current from the relay to the conductor 474 and thence through the closed contact 472 to a conductor 476 leading to the control circuits of the table auxiliary or inching motor 65 and operative to initiate the final slow movement of the table 22.

The current proceeds through the conductor 476 to a conductor 480 and thence through the closed stop switch 76. From the closed stop switch 76, the current flows into a conductor 481 and through a conductor 482 to a normally closed contact 483 arranged to operate with a reverse motor control switch 484. From the closed contact 483, the current continues through a conductor 485 to an actuating coil 486 of a forward motor control switch 487 and thence to a conductor 488 and a conductor 489 leading to the line conductor L3 to complete the circuit.

Energization of the coil 486 actuates the forward motor control switch 487 to energize the motor 65 in a forward direction by closing the contacts of the switch 487 connecting the line conductors L1, L2 and L3 with the motor 65 for forward rotation. Actuation of the switch 487 also opens a normally closed contact 493 arranged to operate with the switch 487 and break the reverse control circuit to insure against the flow of current to the motor in the opposite direction. With the motor 65 thus energized, the table 22 will move in a forward direction at a slow rate until the stop dog 74 operates to actuate the final position switch 76 and open the circuit to the coil 486. Upon deenergization of the coil 486, the switch 487 returns to its open position to disconnect the power source from the motor 65 and close the contact 493.

The motor 65 is also provided with a plugging switch 494 arranged to operate with the rotation of the motor shaft and, when the contact 493 is closed, a circuit is established to energize a coil 495 of the reverse motor control switch 484. The circuit originates at the source represented by the line conductor L1 and continues through the conductor 428, the push button 429, the conductor 430, the relay 427, the conductor 431, the conductor 437, the closed contact 436, the conductor 438, the conductor 473, the relay 471, the conductor 474, the closed contact 472, the conductor 476, an arm 496 and a contact 497 of the plugging switch 494 and thence through a conductor 498 leading to the closed contact 493. From the closed contact 493, the current flows into a conductor 499, to the coil 495 and back to its source represented by the line conductor L3 through the conductors 452 and 453.

Completion of the foregoing circuit energizes the coil 495 to actuate the reverse motor control switch 484 and close its contacts connecting the line conductors L1, L2 and L3 to the motor 65 for reverse rotation. Actuation of the switch 484 also closes a contact 504 and opens the contact 483 to preclude energization of the coil 486 with the consequent actuation of the forward motor control switch 487. Closing of the switch 484 functions to brake the motor 65 and stop the movement of the table 22 at precisely the desired position. When the forward rotation of the motor 65 terminates, the arm 496 of the plugging switch 494, pivots away from the contact 497 breaking the reverse control circuit to deenergize the coil 495 and open the switch 484 before reverse rotation of the motor 65 can occur.

The momentary closing of the contact 504 with the switch 484 energizes a time delay relay 505 by completing a circuit originating with the line conductor L1. The current flows from the line conductor L1 through the conductor 428, the push button 429, the conductor 430, the relay 427, the conductor 431, the conductor 437, the closed contact 436, the conductors 438 and 473, the relay 471, the conductor 474, the closed contact 472, the conductor 476, a conductor 506, the closed contact 504, a conductor 507, the relay 505, and a conductor 508, returning to the line conductor L3 through the conductors 452 and 453. Energization of the time delay relay 505 results in the closing of its contacts 510 and 511.

Closing of the contact 510 functions to automatically zero the stepping switches shown in Fig. 20 by connecting the power source L1 to the relay 322 to energize it and initiate the zeroing operation in the same manner as was described when actuating the push button 320. This circuit originates with the line conductor L1 shown in Fig. 20 and flows through the conductors 246 and 247 to a conductor 513 connected to the contact 510 as shown in Fig. 21 and thence through a conductor 514 to the conductor 321 (Fig. 20) connected to the relay 322. From the relay 322, the current continues through the circuit, as previously described, to effect zeroing of the several stepping switches.

The closed contact 511 of the relay 505 establishes a circuit to energize the solenoid 191 that moves the reversing clutch gear 37 to neutral position after the table has been positioned, as previously described. The circuit originates with the line conductor L1 (Fig. 21) and proceeds through the conductor 428, the closed push button 429, the conductor 430, the relay 427, the conductor 431, the conductor 437, the closed contact 436, the conductor 438, the conductor 473, the relay 471, the conductor 474, the closed contact 472, the conductor 476, and the conductor 480 leading to the closed contact 511. From the closed contact 511 the current flows through a conductor 515 to the solenoid 191 and thence through a conductor 516 to the conductor 489 leading to the line conductor L3 to complete the circuit.

For the purpose of illustrating a complete cycle of operation, the previously mentioned example of machining the cylindrical openings 241 and 242 in the workpiece 29 will be referred to. As stated, it is assumed that the distance between the centers of the two openings is 19.2528 inches, the centers being in the same horizontal plane. After the opening 241 has been machined, the cutter is withdrawn and the table may then be moved to position the workpiece in relation to the cutter 28 to complete the machining of the opening 242, which in this instance, would require a movement of 19.2528 inches.

The first step in initiating the movement is to dial the numerical expression, representing the displacement, on the tabulator 61. In this instance, the digits 1–9–2–5–2–8 would be dialed successively to set up the count in the counter 66. In addition to setting the counter 66, the tabulator 61 is connected to an indicator 520 by a mechanism (not shown) to indicate each number dialed in a set of windows 521 illustrated in Fig. 22 and included as a part of the indicator. Thus, the first digit dialed would appear in the window representing the "tens" of the numeral, the second number dialed would appear in the window representing the "ones" of the numeral and so on until the entire numerical expression would appear consecutively in the windows 521. After the digits of the numerical expression have been dialed, the indicator 520 may be checked to insure that no error has been committed. If an error has been made at any time during the dialing operation, the push button 320 may be actuated to reset the counter 66 as well as the indicator 520 to zero, and the number may then be redialed.

When the proper number appears on the indicator 520, the gauge nut 64 is initiated in its movement by actuating the push button 350 to energize the motor 71. The gauge nut will then move at rapid rate along its cooperating screw 63 until it approaches the end of its movement when the counter 66 operates, as previously described, to deenergize the motor 71 and energize the secondary motor 72 for moving the gauge nut 64 at a slow rate until the precise desired position is reached. If for some reason it is desired to stop the movement of the gauge nut 64 before it has reached its final position, the stop push button 352 may be actuated and either motor 71 or 72, depending upon which one is in operation, will be deenergized.

When the gauge nut 64 reaches its final position, the main table driving motor 31 is automatically energized, as previously described, to initiate movement of the table 22 at a rapid rate. The table will travel at rapid rate until it approaches its final position whereupon the stop dog 74 will trip the control switch 119 to deenergize the main table driving motor 31 and automatically energize the auxiliary motor 65 for driving the table at a slow rate of movement to its final position. When the final position is reached the stop dog 74 actuates the stop switch 76 to deenergize the motor 65 and stop the movement of the table 22 at precisely the desired position. The table may be stopped while in a positioning movement by actuating the push button 429 which will deenergize either motor 31 or 65, and then started again to complete the established movement by actuating the push button 434.

When the stop switch 76 is actuated to stop the table 22 at the precise predetermined position, the stepping switches of the counter mechanism as well as the indicator 520 are automatically reset to their zero positions and the entire apparatus is set for initiating another positioning operation.

From the foregoing description of the construction and operation of a precision milling and boring machine embodying the improved positioning mechanism provided by the present invention, it will be apparent that the new positioning mechanism is especially adapted to effect a positioning operation with great accuracy and a minimum of effort and computation on the part of the machine operator.

Although the illustrative embodiment of the invention has been described in considerable detail for the purpose of setting forth an operative and practical exemplifying structure, it is to be understood that the structure shown and described is intended to be illustrative only and that various characteristics of the invention may be incorporated in other structural forms without departing from the spirit and scope of the invention as defined in the subjoined claims.

The principles of the invention having now been fully explained in connection with the foregoing description of illustrative embodying apparatus, the invention is hereby claimed as follows:

1. In a positioning mechanism for a machine tool having a frame and a carriage movably mounted on said frame, a gauge member movable in cooperating relationship with said carriage, a scale arranged for movement in synchronism with said gauge member and presenting indicia representing finite increments of movement of said carriage, photoelectric scanning apparatus disposed to cooperate with said scale in manner to scan said indicia as said gauge member is moved, electronic counting apparatus operatively connected with said scanning apparatus in manner to count the scale indicia being scanned, tabulating mechanism arranged to preset said counting apparatus for conditioning it to count a predetermined number of indicia representing the number of increments of movement required in positioning said carriage, control mechanism responsive to operation of said counting apparatus and operative to stop movement of said gauge member precisely at the position corresponding to the predetermined position to which said carriage is to be moved as preset on said counting apparatus by said tabulating mechanism, power actuated means operatively connected to move said carriage selectively at a rapid rate or at a slow rate in positioning it relative to said frame, and control mechanism associated with said gauge member and operative upon said carriage moving means to reduce the rate of movement of said carriage from rapid rate to slow rate as said carriage approaches the position predetermined by positioning of said gauge member and to stop said carriage precisely at the predetermined position established therefor through operation of said tabulating mechanism.

2. In a machine tool having a frame and a movable element movably mounted on said frame, power actuated driving mechanism operatively connected to effect movement of said movable element, a gauge screw disposed parallel with the path of movement of said element, a gauge nut cooperating with said gauge screw, a dial bearing gauge marks mounted on said screw, a photoelectric cell disposed to scan said dial in manner to respond to each of said gauge marks as said screw is turned, power means operatively connected to turn said gauge screw, control means responsive to operation of said photoelectric cell in scanning said dial and operative to control said gauge screw power means for positioning said nut, and trip mechanism associated with said nut and operative upon said element driving power mechanism to effect positioning of said movable element in accordance with the position of said nut, whereby said movable element may be moved to a position predetermined by operation of said photoelectric cell actuated control means.

3. In a positioning mechanism for controlling movement of a machine tool carriage, a dimensional gauge presenting a reference scale bearing spaced indicia representing equal increments of movement, an adjustable gauging member disposed to be positioned in accordance with said dimensional gauge, counting means associated with said gauge and operative to count the number of indicia representing the total of increments of movement between successive positions of said gauging member, means responsive to said counting means and operative to control movement of said gauging member in accordance with a predetermined number of increments of movement, and means arranged to effect presetting of said counting means, whereby the extent of movement of said gauging member between successive positions may be predetermined.

4. In a positioning apparatus for a machine tool, a screw adapted to effect precise movements of a machine element when turned in engagement with said element, an indicating dial fixed on said screw and presenting equally spaced angularly disposed indicia, a photoelectric cell disposed to scan said dial indicia as said screw is turned in moving said machine element, and an electronic counting device operatively connected to said photoelectric cell and serving to count said indicia as said screw is turned.

5. In a positioning apparatus for a movable element of a machine tool, a screw and nut mechanism operatively connected to effect precise movements of said movable element, an indicating dial arranged to be turned by said screw and nut mechanism to indicate movement of said element said dial presenting angularly spaced indicia, a photoelectric cell disposed to scan said dial indicia as said element is moved, and means to record the number of indicia scanned by said cell.

6. In a positioning mechanism for a movable platen of a machine tool, the combination with a gauge screw rotatably disposed parallel with the direction of movement of said platen, of a gauge nut cooperating with and movable along said gauge screw as it is rotated, counting mechanism responsive to electrical impulses and associated with said gauge screw to receive an electrical impulse for each increment of angular displacement of said screw as it rotates to thereby count its increments of movement, adjusting means operative to preset said counting mechanism for effecting angular displacement of said screw to position said gauge nut at a predetermined position, and platen operating mechanism arranged to operate in accordance with the position of said gauge nut to position the movable platen precisely as predetermined by presetting said counting mechanism.

7. In a precision positioning mechanism for precisely positioning a movable member of a machine tool organization, an electronic counter having a predetermined total counting capacity, selectively operable presetting mechanism arranged to actuate said counter in manner to reduce its counting capacity to a predetermined residue, a gauge screw arranged to control movement of said movable machine tool member, scanning mechanism disposed to respond to rotational displacement of said gauge screw in effecting positioning of said movable member and operative to actuate said electronic counter in manner to further reduce its residue of counting capacity, and control apparatus operatively connected to respond to exhaustion of the counting capacity of said electronic counter and operative to stop rotation of said gauge screw in a position at which it will cause said movable machine tool member to be stopped precisely at a predetermined position.

8. In an apparatus for precisely positioning a movable element of a machine tool, an electronic counting mechanism, tabulating means arranged to preset said counting mechanism at a predetermined numerical value representing units of measurement, a gauge stop, a scale operatively associated with said gauge stop in manner to register movement of said gauge stop in units of measurement, a scanning device disposed to scan said scale as said gauge stop is moved said scanning device being operatively connected to said counting mechanism, means responsive to the scanning of the number of scale units corresponding to the numerical setting of said counting mechanism and operative to stop movement of said gauge stop at the position predetermined by operation of said tabulating means, and mechanism operating automatically to position said movable machine tool element in accordance with the position of said gauge stop.

9. In precision positioning mechanism for controlling the movement of an adjustable member of a machine tool organization, a scale connected to operate in synchronism with movement of said member, a counting mechanism disposed to scan said scale to count increments of movement indicated thereby, apparatus operative to preset said counting mechanism for conditioning it to effect a predetermined displacement of said adjustable member, and control means responsive to operation of said counting mechanism and serving to reduce the speed of movement of said member as it approaches the end of the predetermined displacement.

10. In a machine tool, a base, a carriage movably mounted on said base, a gauge screw disposed parallel with the direction of movement of said carriage, guide means supporting said gauge screw for axial movement along said base, a gauge nut disposed on said gauge screw, positioning means arranged to position said gauge nut along said screw, a dog mounted on said carriage in position to engage said gauge nut in the course of movement of said carriage and thereby effect axial movement of said screw, and control means operative in response to axial movement of said screw to stop said carriage.

11. In a mounting for a shaft, a ribbed portion formed in said shaft, a cradle arranged to support said shaft, annular grooves formed in said cradle to receive said ribbed portion of said shaft, and ball bearings disposed to support said cradle at points horizontal to the axis of said shaft, whereby axial movement of said shaft may be readily and accurately accomplished.

12. In a mounting for a screw, a ribbed bearing portion on said screw, a cradle arranged to support said screw, annular grooves formed in said cradle to receive said ribbed bearing portion of said screw, bearings disposed to support said cradle at points in a horizontal plane through the axis of said screw, and a bearing cap bearing on said screw at a point opposite the point resting on said cradle and adjustable to vary the bearing pressure of said screw upon said cradle, whereby axial as well as rotary movement of said screw may be accurately and readily accomplished.

13. In a mounting for a screw, a cradle disposed to carry said screw, means arranged to lock said screw against axial movement relative to said cradle, and bearings disposed to support said cradle at points in a plane horizontal to the axis of said screw to permit said cradle to move with axial movements of said screw, whereby accurate axial movements of said screw may be readily accomplished.

14. In a machine tool, a frame, a machine member movably mounted on said frame, power actuated means operatively connected to move said movable member selectively at a rapid rate or at a slow rate in positioning it relative to said frame, a measuring scale connected to move in synchronism with the movement of said movable member and bearing graduations representative of units of distance moved by said member, a photoelectric scanning device disposed to scan said measuring scale as it moves in synchronism with the movement of said member, an electronic counting device connected to be actuated by said scanning device and operative to count the scale graduations scanned thereby, a first switch connected to control said power actuating means and to be actuated by said counting device before it has completed counting a desired number of graduations for actuating said power means to change the rate of movement of said movable member from the rapid rate to the slow rate, and a second switch connected to control said power actuating means and to be actuated by said counting device when it completes the desired count of graduations for actuating said power means to stop the movement of said member at the precise desired position, whereby the position of said movable machine member may be controlled in accordance with the count of scale divisions recorded by said electronic counting device.

15. In a machine tool, a movably mounted carriage, movable gauge member mounted in position to be engaged by said carriage as it travels in its path of movement, power means operatively connected to move said carriage and said gauge member selectively, a first switching means connected to be actuated by said gauge member when the latter is engaged by said carriage, said first switching means being connected to control the operation of said power means to stop the movement of the carriage when actuated, mechanism arranged to position said gauge member including a linear measuring scale movable in coordination with the movement of said gauge member, a photoelectric device disposed to scan said linear scale, a counter associated with said scanning photoelectric device and operative to count the movements of said measuring scale scanned thereby, means arranged to effect presetting of said counting mechanism to count a desired number of increments of said measuring scale, and a second switching means connected to be actuated by said counting means when the latter has counted the desired number of increments, said second switching means being connected to control the operation of said power means to stop the movement of said gauge member when actuated, whereby the carriage may be positioned by setting said counting means to count a desired number of increments of movement for establishing the position of said gauge member, and the carriage may be moved to the position established by said gauge member.

16. In apparatus for precisely positioning a machine tool carriage or the like, a counting mechanism responsive to electrical impulses, apparatus connected to transmit electrical impulses to said counting mechanism to impress upon said counting mechanism a predetermined numerical value representing a linear dimension, a movable gauging member, electrical impulse producing means connected to transmit an electrical impulse to said counting mechanism for each increment of movement of said gauging member, actuating means connected to move said gauging member and operating under the control of said counting mechanism to stop the movement of said gauging member when the counting mechanism has received a number of impulses from said electrical impulse producing means corresponding to the number impressed upon it, and precision positioning apparatus operating under the control of said gauging member to move the machine tool carriage precisely to the position established by said gauging member in response to the operation of said counting mechanism.

References Cited in the file of this patent
UNITED STATES PATENTS

| Number | Name | Date |
|---|---|---|
| 1,698,325 | Thomas et al. | Jan. 8, 1929 |
| 1,981,224 | De Vlieg | Nov. 20, 1934 |
| 2,007,180 | Doran et al. | July 9, 1935 |
| 2,012,249 | Sassen | Aug. 20, 1935 |
| 2,083,682 | Balsiger | June 15, 1937 |
| 2,230,864 | Edwards et al. | Feb. 4, 1941 |
| 2,267,239 | Johnson | Dec. 23, 1941 |
| 2,269,290 | Schurger | Jan. 6, 1942 |
| 2,273,956 | Hall | Feb. 24, 1942 |
| 2,293,730 | Guttman | Aug. 25, 1942 |
| 2,311,142 | Turrettini | Feb. 16, 1943 |
| 2,318,010 | Panish | May 4, 1943 |
| 2,352,183 | Bullard | June 27, 1944 |
| 2,375,665 | Koulicovitch | May 8, 1945 |
| 2,387,215 | Fawkes | Oct. 16, 1945 |
| 2,406,299 | Koulicovitch | Aug. 20, 1946 |
| 2,427,493 | Bullard | Sept. 16, 1947 |
| 2,464,610 | Siekmann | Mar. 15, 1949 |
| 2,477,701 | McCallum | Aug. 2, 1949 |
| 2,481,347 | Riggen | Sept. 6, 1949 |
| 2,510,093 | Ferguson et al. | June 6, 1950 |
| 2,529,804 | Harnischfeger et al. | Nov. 14, 1950 |